US008743093B2

(12) United States Patent
Toya

(10) Patent No.: US 8,743,093 B2
(45) Date of Patent: Jun. 3, 2014

(54) DISPLAY APPARATUS

(75) Inventor: Takashi Toya, Azumino (JP)

(73) Assignee: Japan Display West Inc., Aichi-Ken (JP)

( * ) Notice: Subject to any disclaimer, the term of this patent is extended or adjusted under 35 U.S.C. 154(b) by 1298 days.

(21) Appl. No.: 11/974,027

(22) Filed: Oct. 11, 2007

(65) Prior Publication Data

US 2008/0088552 A1 Apr. 17, 2008

(30) Foreign Application Priority Data

Oct. 11, 2006 (JP) ................................ 2006-278144
Oct. 11, 2006 (JP) ................................ 2006-278149

(51) Int. Cl.
*G06F 3/038* (2013.01)

(52) U.S. Cl.
USPC ............... 345/204; 345/205; 345/87; 345/98; 345/55

(58) Field of Classification Search
USPC .......... 345/204–205, 87–90, 98, 100, 55, 690
See application file for complete search history.

(56) References Cited

U.S. PATENT DOCUMENTS 5,712,652 A * 1/1998 Sato et al. ........................ 345/90
5,945,972 A * 8/1999 Okumura et al. ............... 345/98
6,515,645 B1 2/2003 Yano et al.
6,693,614 B2 * 2/2004 Kamiya et al. .................. 345/89
6,771,247 B2 * 8/2004 Sato et al. ........................ 345/98
6,803,896 B2 * 10/2004 Senda et al. .................... 345/98
6,850,219 B2 2/2005 Aoyama et al.
6,853,371 B2 2/2005 Miyajima
6,952,298 B2 10/2005 Hara et al.
7,019,726 B2 * 3/2006 Yokoyama ...................... 345/98
7,027,026 B2 4/2006 Tsutsui
7,061,458 B2 * 6/2006 Lin et al. ......................... 345/87
7,068,251 B2 * 6/2006 Lin et al. ......................... 345/87
7,081,875 B2 * 7/2006 Yokoyama et al. ............. 345/90
7,095,391 B2 * 8/2006 Lee ................................. 345/87
7,123,229 B2 * 10/2006 Toyozawa et al. .............. 345/90
7,173,589 B2 * 2/2007 Senda et al. .................... 345/90
7,190,338 B2 3/2007 Kubota
7,339,570 B2 3/2008 Kubota
7,636,078 B2 * 12/2009 Yamazaki et al. ............ 345/100
7,746,308 B2 * 6/2010 Toyozawa et al. .............. 345/90
7,746,309 B2 * 6/2010 Chen et al. ...................... 345/90

(Continued)

FOREIGN PATENT DOCUMENTS

JP HEI 02-253232 10/1990
JP 2000-010530 1/2000

(Continued)

*Primary Examiner* — Jason Mandeville
(74) *Attorney, Agent, or Firm* — K&L Gates LLP

(57) ABSTRACT

A display apparatus includes first scan lines and second scan lines arranged along one direction on a substrate, data signal lines are arranged intersecting the one direction, and display pixels are selected by a scan line selection signal. A first display circuit is connected to the first scan lines using the scan line selection signal and sequentially supplying an image signal which is sequentially input to a pixel electrode. A second display circuit is connected to the second scan lines using the scan line selection signal and includes a holding circuit which holds the image signal and supplies a voltage in accordance with the signal held by the holding circuit to the pixel electrode. A mode switching circuit performs mode switching between an analog display mode and a digital display mode in accordance with a mode switching signal.

13 Claims, 19 Drawing Sheets

(56) References Cited

U.S. PATENT DOCUMENTS

| | | | | |
|---|---|---|---|---|
| 7,932,886 | B2 * | 4/2011 | Higashi | 345/100 |
| 2001/0024187 | A1 * | 9/2001 | Sato et al. | 345/98 |
| 2002/0015031 | A1 * | 2/2002 | Fujita et al. | 345/204 |
| 2002/0036627 | A1 * | 3/2002 | Yokoyama | 345/204 |
| 2002/0190969 | A1 * | 12/2002 | Tsutsui | 345/204 |
| 2003/0142054 | A1 * | 7/2003 | Tada | 345/87 |
| 2003/0151582 | A1 * | 8/2003 | Ishii | 345/100 |
| 2003/0214493 | A1 * | 11/2003 | Akimoto et al. | 345/204 |
| 2004/0066364 | A1 * | 4/2004 | Toyozawa et al. | 345/98 |
| 2006/0103429 | A1 | 5/2006 | Nonaka | |
| 2006/0232535 | A1 * | 10/2006 | Toyozawa et al. | 345/90 |
| 2006/0262075 | A1 * | 11/2006 | Higashi | 345/100 |
| 2007/0146354 | A1 | 6/2007 | Kubota | |

FOREIGN PATENT DOCUMENTS

| | | | |
|---|---|---|---|
| JP | 2000-010530 | A | 1/2000 |
| JP | 2001-264814 | | 9/2001 |
| JP | 2001-350454 | | 12/2001 |
| JP | 2001-350454 | A | 12/2001 |
| JP | 2002-091366 | | 3/2002 |
| JP | 2002-311904 | | 10/2002 |
| JP | 2002-311904 | A | 10/2002 |
| JP | 2002-366116 | | 12/2002 |
| JP | 2002-366116 | A | 12/2002 |
| JP | 2004-062161 | A | 2/2004 |
| JP | 2004-139043 | | 5/2004 |
| JP | 2005-49195 | A | 2/2005 |
| JP | 2005-157273 | A | 6/2005 |
| JP | 2005-292793 | A | 10/2005 |
| JP | 2005-346057 | A | 12/2005 |
| JP | 2006-058893 | A | 3/2006 |
| JP | 2006-098812 | A | 4/2006 |
| JP | 2006-148269 | A | 6/2006 |
| JP | 2006-251820 | A | 9/2006 |
| JP | 2007-11262 | A | 1/2007 |
| JP | 2007-300264 | A | 11/2007 |
| JP | 2007-310051 | A | 11/2007 |
| JP | 2008-22412 | A | 1/2008 |
| JP | 2008-96679 | A | 4/2008 |
| JP | 2008-96681 | A | 4/2008 |
| KR | 2002-0022005 | A | 3/2002 |

* cited by examiner

DISPLAY APPARATUS

BACKGROUND

1. Technical Field

The present invention relates to a display apparatus, and more particularly to an active matrix display apparatus in which a plurality of display pixels, which are selected by a predetermined scan line selection signal with respect to a scan line and also to which an image signal from a data signal line is supplied, are arranged in a matrix form on a substrate.

2. Related Art

This application claims priority to Japanese Patent Applications No. 2006-278144 and No. 2006-278149, both filed on Oct. 11, 2006, which are incorporated herein by reference in its entirety.

Active matrix display apparatuses in which a plurality of scan lines and a plurality of data lines intersecting the scan lines are arranged on a glass substrate or the like, and a switching circuit and a display pixel are disposed at an intersection of each scan line and each data signal line, as in a liquid crystal display element, have been widely used. In regards to these active matrix display apparatuses, a technology for reducing power consumption by displaying a dummy still image or the like when intended image display is not being performed has been considered.

For example, JP-A-2001-264814 discloses an active matrix liquid crystal display apparatus capable of performing multicolor display with low power consumption in a standby state and performing halftone display and moving image display in full color at other times, such as, in a mobile phone application, during a call. Here, a first switching element includes a gate connected to a scan line, a source connected to a data signal line, and a drain connected to a pixel electrode. The pixel electrode is connected to a digital memory via a second switching element which is composed of two switching elements which are connected in parallel. These switching elements include drains connected to an output terminal and an inverted output terminal of the digital memory, respectively, sources connected to the pixel electrode, and gates connected to two control signal lines, respectively.

JP-A-2002-91366 discloses a structure corresponding to two types of display, full color moving image display and still image display with low power consumption, in a single display apparatus. In this structure, a circuit selection circuit composed of two TFTs having different polarities and another circuit selection circuit, which together form a pair, are provided in the vicinity of an intersection of a gate signal line and a drain signal line in a pixel electrode. Further, an image selection circuit which is composed of two TFTs having different polarities is provided adjacent to the circuit selection circuit such that each of the two TFTs of the image selection circuit is connected in series with a respective one of the two TFTs of the circuit selection circuit described above. The gate signal line is connected to the gates of the two TFTs of the image selection circuit, and both TFTs are simultaneously turned ON in accordance with a scan signal. When the two circuit selection circuits select full color moving image display, one of the two TFTs of the circuit selection circuit and a storage capacitor constitute a first display circuit. On the other hand, a holding circuit formed of a static memory is connected between the other one of the two TFTs of the circuit selection circuit and the pixel electrode of liquid crystal. A signal selection circuit, in accordance with a signal from the holding circuit, selects an alternate current drive signal (signal A) or a opposing electrode signal (signal B), and the selected signal is supplied to the pixel electrode of the liquid crystal 21. Accordingly, when the two circuit selection circuits select the still image display, the other one of the two TFTs of the circuit selection circuit and the holding circuit constitute a second display circuit.

With the related art structures described above, when analog full color display such as halftone gray level display is not performed, binary digital still image data is held by a digital memory or a static memory to thereby perform still image display, so that the power consumption concerning image display in the standby state can be reduced.

According to the above related art, however, because the same scan lines are used in both analog display and digital display, a scan line drive circuit is also shared, and the power consumption related to scan line driving and the like remains unchanged. Further, the above related art structures also suffer from an inconvenience because processing of writing dummy data in a non-display region or the like must be performed, even when digital display is performed in an arbitrary display region.

SUMMARY

An advantage of some aspects of the invention is to provide a display apparatus capable of performing both analog display and digital display, in which the power consumption can be more reduced.

A display apparatus according to an aspect of the invention includes a plurality of first scan lines for analog display, which are arranged along one direction on a substrate; a plurality of second scan lines for digital display, which are arranged along this one direction on the substrate; a plurality of data signal lines which are arranged in a direction intersecting the one direction; and a plurality of display pixels which are selected by a predetermined scan line selection signal concerning the first scan line and the second scan line and to which an image signal from the data signal lines is supplied, the plurality of display pixels being arranged in a matrix on the substrate. The display apparatus further includes a first display circuit for the analog display, which is connected to the first scan line via a first switch circuit which operates by means of the scan line selection signal, and which is disposed in the display pixel, the first display circuit sequentially supplying the image signal which is sequentially input to a pixel electrode of the display pixel. The display apparatus also includes a second display circuit for the digital display, which is connected to the second scan line via a second switch circuit which operates by means of the scan line selection signal, and which is disposed in the display pixel, the second display circuit including a holding circuit which holds the image signal and supplying a voltage in accordance with the signal held by the holding circuit to the pixel electrode. In addition, the display apparatus includes a mode switching circuit for performing mode switching between an analog display mode in which the first display circuit operates and a digital display mode in which the second display circuit operates, in accordance with a mode switching signal.

Another advantage of some aspects of the invention is to provide a display apparatus capable of performing both analog display and digital display, in which digital display can be performed in an arbitrary region.

A display apparatus according to another aspect of the invention includes a first scan line drive circuit which outputs a scan line selection signal concerning the first scan line, the first scan line drive circuit including a shift register circuit unit which outputs a sequential designation pulse for sequentially designating each of the first scan lines; and a second scan line drive circuit which outputs a scan line selection signal concerning the second scan line, the second scan line drive circuit including a decoder circuit unit for obtaining access to each of the second scan lines which is desired.

BRIEF DESCRIPTION OF THE DRAWINGS

Exemplary embodiments of the invention will be described in detail based on the following figures, wherein.

DESCRIPTION OF EXEMPLARY EMBODIMENTS

Exemplary embodiments of the invention will be described in detail with reference to the accompanying drawings. In the following description, a liquid crystal display apparatus manufactured using COG (Chip On Glass) technology in which an IC chip is mounted on a substrate having poly-silicon TFTs (Thin Film Transistor) disposed thereon, which can be illuminated by backlight, will be described. However, any display mechanisms, including those other than a liquid crystal device, may also be used, as long as a display apparatus is of an active matrix type and can achieve analog display and digital display in a single apparatus. For example, an LED (Light Emission Diode) array display apparatus, a plasma display apparatus, and so on may be used.

Further, a switching element other than a poly-silicon TFT may also be used. Also, it is not necessary that the COG technology be employed. For example, an amorphous silicon TFT may be used. The poly-silicon TFT may be either a high temperature poly-silicon TFT or a low temperature poly-silicon TFT. Also, a non-linear switching element such as a diode ring, for example, may be used in place of TFTs. In addition, a structure using a mounting technology other than the COG technology may be employed. Further, a structure in which no backlight is used is also applicable. For example, a reflective display apparatus which includes a reflector so that display can be visually recognized by external light can be used.

It should be noted that voltage values or the like in the following examples are given only for illustrative purposes, and can be changed appropriately in accordance with intended use or other considerations related to the display apparatus.

Exemplary Embodiment 1

Figure 1:
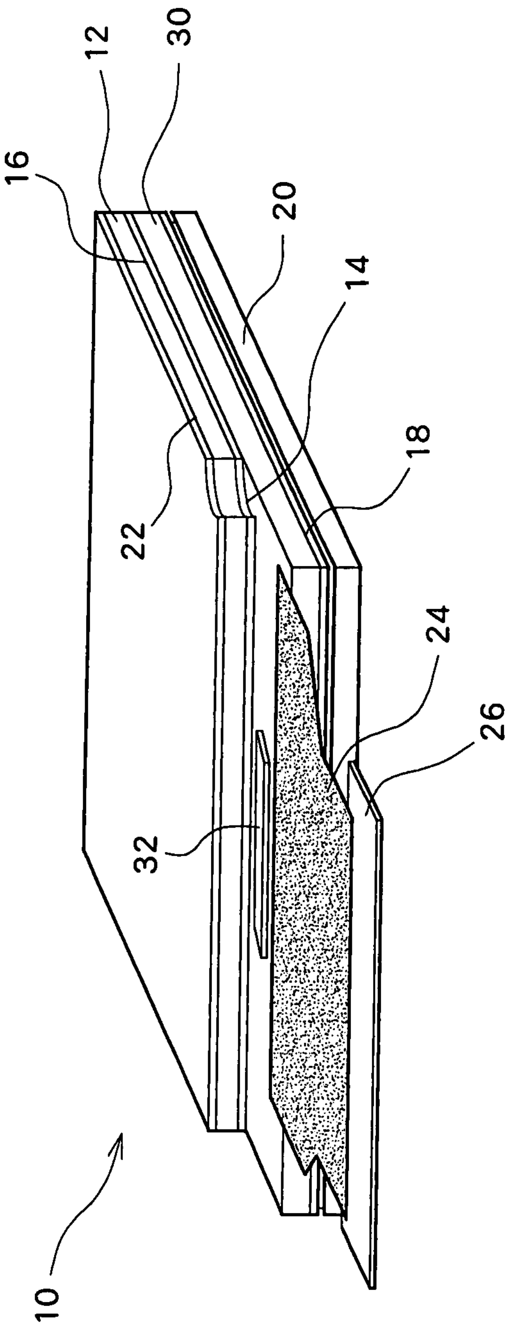
FIG. 1 is a perspective view of a display apparatus according to an exemplary embodiment of the invention.

FIG. 1 is a perspective view of a display apparatus 10. The display apparatus 10 is an active matrix type liquid crystal display apparatus which includes a lower glass substrate 30, an upper glass substrate 12, a seal member 16 for sealing liquid crystal 14 between these glass substrates, a backlight 20 disposed on the bottom surface side of the lower glass substrate 30 via a light guide element 18, and a polarizer element 22 disposed on the top surface side of the upper glass substrate 12. The liquid crystal display apparatus 10 can be illuminated by the backlight. A control IC 32 is mounted on the lower glass substrate 20 by using the COG technology, and is connected with an external circuit substrate 26 by means of an appropriate flexible circuit substrate 24 such as an FPC (Flexible Print Circuit).

The upper glass substrate 12, which sandwiches the liquid crystal 14 together with the lower glass substrate 30 and applies a predetermined drive voltage to both sides of the liquid crystal for achieving display, is also referred to as an opposing substrate because the upper glass substrate 12 is opposed to the lower glass substrate 30. On the upper glass substrate 12, a common electrode which is an opposing electrode is provided so as to oppose a pixel electrode provided on the lower glass substrate 30, and a common electrode potential is applied to the common electrode.

The lower glass substrate 30 is a transparent substrate on which a plurality of scan lines and a plurality of data signal lines are arranged in a lattice shape and on which, in each lattice region, a display pixel and a poly-silicon TFT serving as a switching element are disposed. Here, two types of scan lines are used. One of the two types of scan lines is the same as a scan line of a general active matrix liquid crystal display apparatus. Specifically, when this type of scan line is used, due to a function of the switching element, an image signal from a data signal line is supplied to a pixel electrode of each display pixel selected by the scan line and liquid crystal molecules sealed between the upper glass substrate 12 and the lower glass substrate 30 are driven in accordance with a potential difference between the pixel electrode and the opposing electrode provided on the upper glass substrate 12, thereby enabling display. The other type of scan line is used for displaying a still image.

As described above, of the two types of scan lines which are used, one type of scan line is the same as the scan line of a general active matrix liquid crystal apparatus and is used for halftone display, moving image display, and so on. When the display apparatus is a color display apparatus, this type of scan line is used for full color display. The other type of scan line is used for displaying a still image while suppressing power consumption concerning image display by using a holding circuit capable of holding binary data as will de described below. In order to differentiate between these two types of display, the former can be referred to as "analog display" and the latter can be referred to as "digital display". These two types of display can also be referred to as "dynamic display" and "static display", or, in the case of color display, as "full color display" and "still image display". In the following description, the terms "analog display" and "digital display" will be used primarily, although other names will also be used as appropriate for clarity of the description.

Further, in order to differentiate between the two types of scan lines, the type of scan line for use in analog display will be referred to as a first scan line, while the type of scan line for use in digital display will be referred to as a second scan line. When both analog display and digital display are performed for each display pixel, two scan lines, which are the first and second scan lines, and one data signal line are provided for each display pixel.

Figure 2:
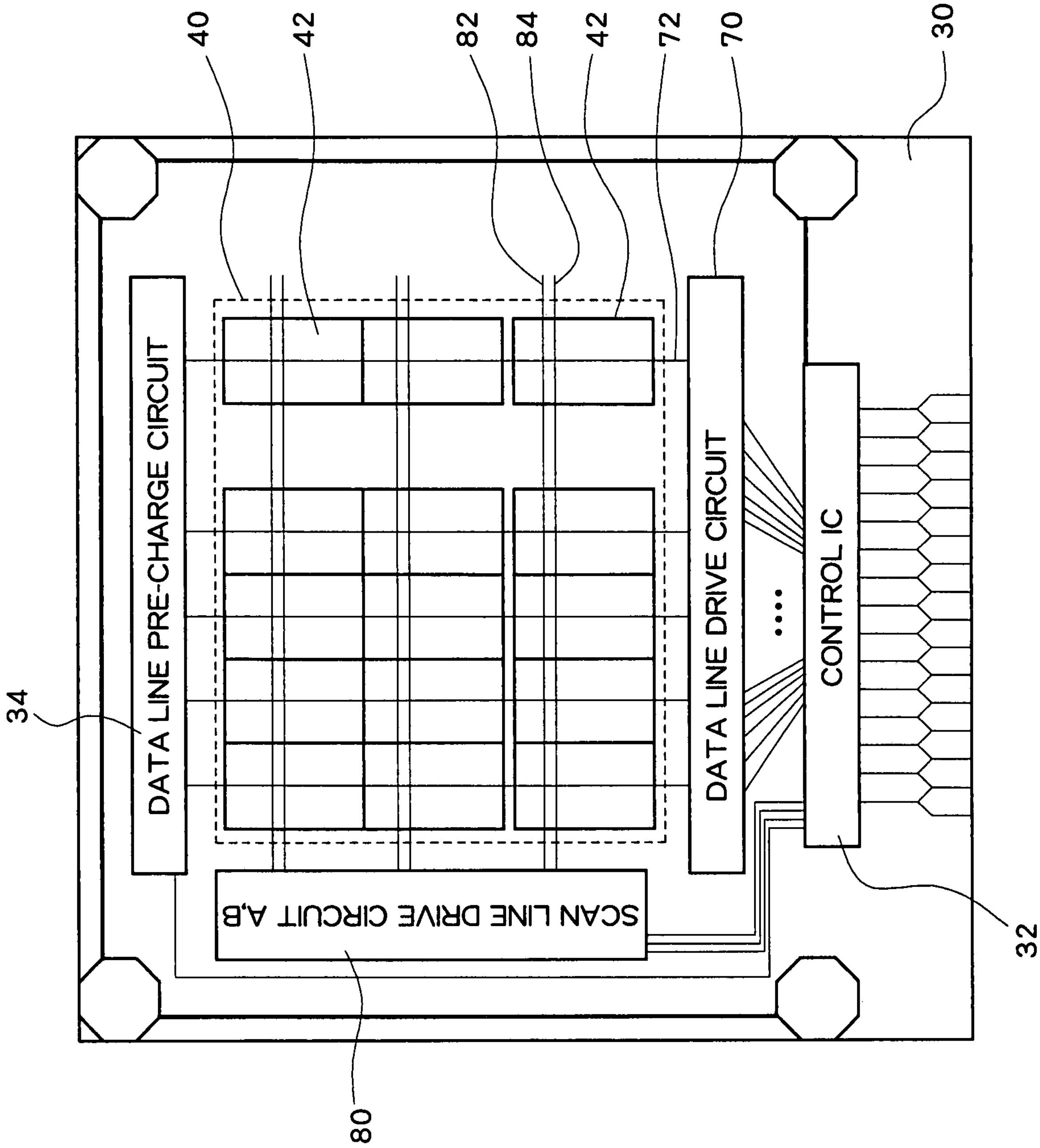
FIG. 2 is a view showing the arrangement of each element on a lower glass substrate according to the exemplary embodiment of the invention.

FIG. 2 shows an arrangement of each element on the lower glass substrate 30. A display region 40 having a substantially rectangular shape in its plan view is provided in the center portion of the lower glass substrate 30. In the peripheral portions of the display region 40, a scan line drive circuit A, B (80) for sequentially selecting each of first scan lines 82 and second scan lines 84, a data line drive circuit 70 which inputs an image signal corresponding to each gray level, i.e. a video signal, to a data signal line 72, and a data line pre-charge circuit 34 which inputs an intermediate potential of a video amplitude before the video signal is input to the data signal line 72, are provided. The scan line drive circuit A, B (80), the data line drive circuit 70, and the data line pre-charge circuit 34, are connected to the control IC 32.

The scan line drive circuit A, B (80), the data line drive circuit 70, and the data line pre-charge circuit 34 are formed on the lower glass substrate 30 by using TFTs which are formed by poly-silicon transistor forming technology as with the TFTs in the display region 40. As such, the lower glass substrate 30 is a SOG (System On Glass) substrate in which active elements are formed.

While a scan line drive circuit which is used for a general active matrix liquid crystal display apparatus can be used as the scan line drive circuit A, B (80), it is preferable to use a scan line drive circuit which is suitable for discrimination between analog display and digital display, in order to reduce power consumption related to scan line driving. The scan line drive circuit A, B (80) will be described in detail below.

A data line drive circuit which is used for a general active matrix liquid crystal display apparatus can be used as the data line drive circuit 70, which will be described in detail below.

The control IC 32, which is an LSI (Large Scale Integrated circuit) chip having a function of controlling the operations of the scan line drive circuit A, B (80), the data line drive circuit 70, the data line pre-charge circuit 34, and so on, is mounted by the COG technology on the line pattern provided on the lower glass substrate 30. This line pattern extends to the scan line drive circuit A, B (80), the data line drive circuit 70, the data line pre-charge circuit 34, and so on, and also extends to the end portion of the lower glass substrate 30, where the line pattern is connected to the flexible circuit substrate 24 as described above with reference to FIG. 1.

The display region 40 is a region in which a plurality of display pixels 42 are arranged in a matrix. In this display region 40, a plurality of first scan lines 82 and a plurality of second scan lines 84 from the scan line drive circuit A, B (80) are arranged along one direction of the lower glass substrate 30 in its plan configuration, and a plurality of data signal lines 72 from the data line drive circuit 70 are arranged along a direction intersecting the one direction, such as along a direction orthogonal to the one direction, for example. In the example shown in FIG. 2, the first scan lines 82 and the second scan lines 84 are arranged along the left-right direction on the sheet plane, and the data signal lines 72 are arranged along the top-bottom direction on the sheet plane. The first scan lines 82 and the second scan lines 84 are arranged in pairs. The display region 40 is segmented into a plurality of lattice regions by these pairs of scan lines and the data signal lines 72, and the display pixel 42 is disposed in each lattice region. Here, sub pixels are used for R, G, B, respectively, in the case of a color display apparatus, and in the following description, this sub pixel will be described as the display pixel 42.

Figure 3:
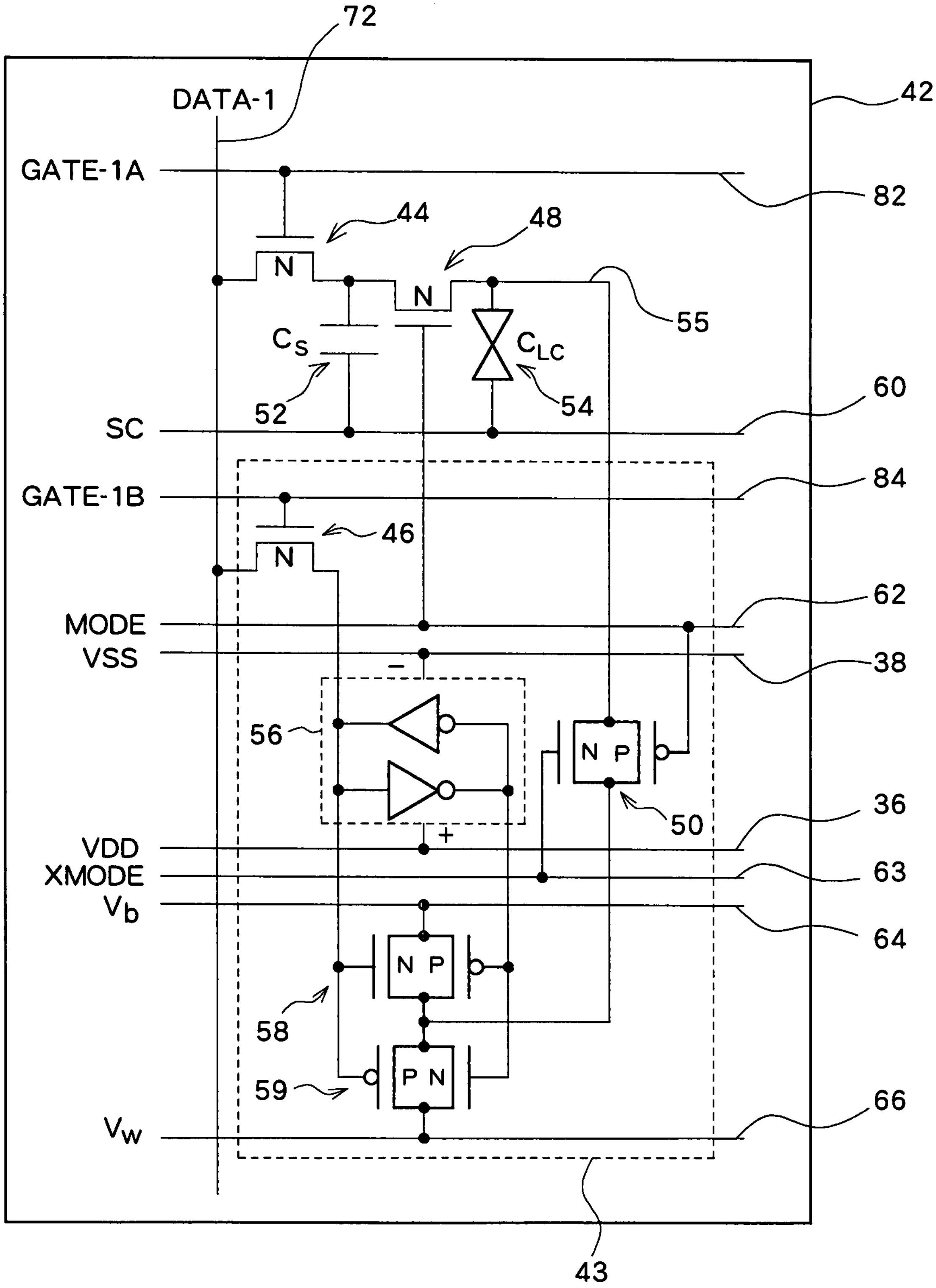
FIG. 3 is a view for explaining a structure of a display pixel in the exemplary embodiment of the invention.

FIG. 3 is a view for explaining the structure of the display pixel 42. In the following description with reference to FIG. 3, reference numerals shown in FIGS. 1 and 2 will be used. In FIG. 3, a single pixel located on the upper left corner of the display region 40 on the sheet plane of FIG. 2 is shown as a representative example. More specifically, when, in order to discriminate among a plurality of display pixels 42, the position of a lattice region defined by the first scan line 82, the second scan line 84, and the data signal line 72 is represented by coordinates (X,Y), with the direction to the right being designated as the X direction, the direction to the bottom being designated as the Y direction, and the upper left point on the sheet plane being designated as an origin in FIG. 2, the display pixel 42 shown in FIG. 3 is located at a position (1,1) in the display region 40. Similarly, when, in order to discriminate among a plurality of first scan lines 82, a plurality of second scan lines 84, and a plurality of data signal lines 72, respectively, numbers are assigned to these lines in ascending order along the above-described X and Y directions, respectively, with the upper left point in FIG. 2 being designated as an origin, the first scan line 82, the second scan line 84, and the data signal line 72 corresponding to the display pixel 42 shown in FIG. 3 are designated by the number 1. In order to indicate this, in FIG. 3, the first scan line 82 is denoted as GATE-1A, the second scan line 84 is denoted as GATE-1B, and the data signal line 72 is denoted as DATA-1.

In FIG. 3, the liquid crystal 14 for performing display is denoted as a liquid crystal capacitor CLC (54). The liquid crystal capacitor $C_{LC}$ (54) is a capacitor between a pixel electrode line 55 and a common electrode signal line 60 which is an opposing electrode. Here, the common electrode line 60 is denoted as SC.

Each signal line or the like in FIG. 3 will be described first. VDD (36) and VSS (38) are a power source voltage line and a ground line of the control IC 32, respectively, and are set to VDD=+5V and VSS=0V, for example.

The common electrode signal line 60 is a signal line which transmits a common electrode signal SC to be applied to the common electrode which is an opposing electrode provided on the upper glass substrate 12, as described above. For the purpose of driving the liquid crystal 14 by an alternate current, a signal having a rectangular waveform, which changes in the range of 0V to +4V, for example, can be used as the common electrode signal SC.

Vb (64) and Vx (66) are signal lines which are used for alternate current driving of the liquid crystal 14 during digital display. Specifically, Vw (66) is a signal line which transmits a potential which causes the liquid crystal 14 to perform white display when the signal thereof is applied to the pixel electrode line 55, and transmits the same signal as the common electrode signal in the common electrode signal line 60. Vb (64) is a signal line which transmits a potential which causes the liquid crystal 14 to perform black display when the signal thereof is applied to the pixel electrode line 55, and transmits an inverted signal of the common electrode signal in the common electrode signal line 60.

MODE (62) and XMODE (63) are signal lines which transmit two mode switching signals for switching between an analog display mode and a digital display mode. In order to differentiate between the two mode switching signals, a signal in the MODE (62) can be referred to as a mode switching first signal and a signal in the XMODE (63) can be referred to as a mode switching second signal. The mode switching first signal in the MODE (62) and the mode switching second signal in the XMODE (63) are inverted with respect to each other. When the mode switching first signal in the MODE (62) is at an H level and the mode switching second signal in the XMODE (63) is at an L level, the analog display mode can be achieved, and when the mode switching first signal in the MODE (62) is at an L level and the mode switching second signal in the XMODE (63) is at an H level, the digital display mode can be achieved.

The mode switching first signal in the MODE (62) and the mode switching second signal in the XMODE (63), having opposite polarities as described above, also have different amplitudes and mutually asymmetric waveforms, because of the following functional difference between the two mode switching signals. Specifically, while, with the signal in the MODE (62) being at the H level, an N channel transistor 48 is turned ON for transmitting an analog image signal to the pixel electrode line 55, with the signal in the XMODE (63) at the H level, switching between two potential levels in the Vb (64) or the Vw (66) is simply performed. For example, with regard to switching between the analog display mode and the digital display mode, the levels of the mode switching first signal can be set as H level=+9V and L level=0V, and the levels of the mode switching second signal can be set as H level=+4V and L level=−4V.

Referring to FIG. 3, each element constituting the display pixel 42 will be described. An N channel transistor 44 is an element which operates by means of a scan line selection signal of the first scan line 82. Further, an N channel transistor 46 is an element which operates by means of a scan line selection signal of the second scan line 84. In order to discriminate between these two elements, the N channel transistor 44 can be referred to as a first switch circuit and the N channel transistor 46 can be referred to as a second switch circuit.

Another N channel transistor 48 is further connected between the N channel transistor 44, i.e. the first switch circuit, and the pixel electrode line 55. This N channel transistor 48 is an element which operates by the mode switching first signal in the MODE (62) and can be referred to as a third switch circuit. When both the N channel transistor 44 which is the first switch circuit and the N channel transistor 48 which is the third switch circuit are turned ON, that is, when the first scan line 82 is selected by a scan line selection signal and also the analog display mode is selected by the mode switching first signal, an image signal data on the data signal line 72, i.e. a video signal data, is transmitted to the pixel electrode line 55 and written in the liquid crystal 14.

Here, with regard to the display pixel 42, if it is assumed that a circuit for analog display which sequentially supplies an image signal sequentially input from the data signal line 72 to the pixel electrode line 55 of the display pixel 42 is designated as a first display circuit, the liquid crystal capacitor $C_{LC}$ 54 and the storage capacitor $C_S$ 52 correspond to this first display circuit in a narrow sense, and the first display circuit can further include, in a broad sense, the N channel transistors 44 and 48.

A holding circuit 56 which is formed by two inverters connected in a ring shape and which can statically hold data is connected on the output side of the N channel transistor 46 which is the second switch circuit. The holding circuit 56, which has a function of statically holding image signal data written therein, is a static memory which consumes substantially no electric power when holding data.

Further, two pairs of transmission gates 58 and 59 each provided between output terminals of the two inverters forming the holding circuit 56 have a function of supplying a signal of the Vb (64) or a signal of the Vw (66) to a transmission gate 50, in accordance with a signal held by the holding circuit 50. Because the transmission gate 50 further connects to the pixel electrode line 55, the transmission gates 58 and 59 have a function of a pixel electrode potential selection switch which selects whether the potential to be supplied to the pixel electrode line 55 is at a signal level of Vb (64) or a signal level of Vw (66) in accordance with the data stored in the holding circuit 56.

The transmission gate 50 is a circuit which is operated by the mutually inverted signals, the mode switching second signal of the XMODE (63) and the mode switching first signal of the MODE (62), and can be referred to as a fourth switch circuit. The transmission gate 50, i.e. the fourth switch circuit, has a function of supplying a signal of Vb (64) or a signal of Vw (66) which is an output of the two pairs of the transmission gates 58 and 59 to the pixel electrode line 55. Specifically, when the XMODE (63) is at an H level and the MODE (62) is at an L level, the transmission gate 50 supplies a signal of Vb (64) or a signal of Vw (66) to the pixel electrode line 55 in accordance with the signal held by the holding circuit 56. Because the signal of Vw (66) is the same as SC of the common electrode signal line 60 and the signal of Vb (64) is an inverted signal of SC as described above, the liquid crystal 14 provided between the pixel electrode line 55 and the common electrode signal line 60 can be driven by an alternate current with regard to the signal held in the holding circuit 56. More specifically, the liquid crystal 14 can display a binary still image corresponding to the signal held by the holding circuit 56.

Here, with regard to the display pixel 42, if a circuit for digital display which includes the holding circuit 56 for holding an image signal and supplies a voltage in accordance with the signal held by the holding circuit 56 to the pixel electrode line 55 is referred to as a second display circuit, the holding circuit 56 corresponds to the second display circuit in a narrow sense, and further, in a broad sense, a circuit further including the N channel transistor 46, the holding circuit 56, the transmission gates 58 and 59, and the transmission gate 50 can be referred to as the second display circuit. In FIG. 3, a circuit portion 43 enclosed by the dotted line corresponds to the second display circuit in a broad sense. Here, a circuit portion of the display pixel 42 other than the circuit portion 43 enclosed by the dotted line corresponds, in a broad sense, to the first display circuit as described above.

Further, because the N channel transistor 48 is operated by the mode switching first signal in the MODE (62) and the transmission gate 50 is operated by the mode switching second signal in XMODE (63) in such a manner that these components have a function of switching between the analog display mode and the digital display mode, these circuit portions can be collectively referred to as a mode switch circuit.

As described above, with regard to each display pixel 42 of the display apparatus 10, the first scan line 82 or the second scan line 84 is selected by a predetermined scan line selection signal, an image signal from the data signal line 72 is received, the analog display mode or the digital display mode is selected by the mode switching first signal and the mode switching second signal to thereby actuate the first display circuit or the second display circuit so that analog display or digital display can be achieved.

Referring again to FIG. 2, the scan line drive circuit A, B (80) will be described. The scan line drive circuit A, B (80) is a circuit having a function of generating a scan line selection signal. More specifically, the san line drive circuit A, B (80) performs selection between the first scan line 82 and the second scan line 84, and generates a scan line selection signal for performing sequential and orderly selection among a plurality of the first scan lines 82 and a plurality of the second scan lines 84.

While the scan line drive circuit A, B (80) is shown as a single chip in FIG. 2, the scan line drive circuit A, B (80) may be formed by a plurality of chips. In such a case, a plurality of chips may be arranged along a plurality of arbitrary sides of the display region 40. For example, the scan line drive circuit A, B (80) may be composed of two chips, of which one chip is disposed on one of two sides which are opposite to each other with the display region 40 being interposed therebetween and the other chip is disposed on the other side.

Accordingly, assuming that a circuit which generates a signal for selecting a specific scan line among a plurality of the first scan lines 82 is referred to a first scan line drive circuit and that a circuit which generates a signal for selecting a specific scan line among a plurality of the second. scan lines 84 is differentially referred to a second scan line drive circuit, the scan line drive circuit A, B (80) has a structure and a function of a combination of the first scan line drive circuit and the second scan line drive circuit. Specifically, the scan line drive circuit A, B (80) includes an element which is shared by the first scan line drive circuit and the second scan line drive circuit as a common portion and an element which is unique for an individual circuit.

Figure 4:
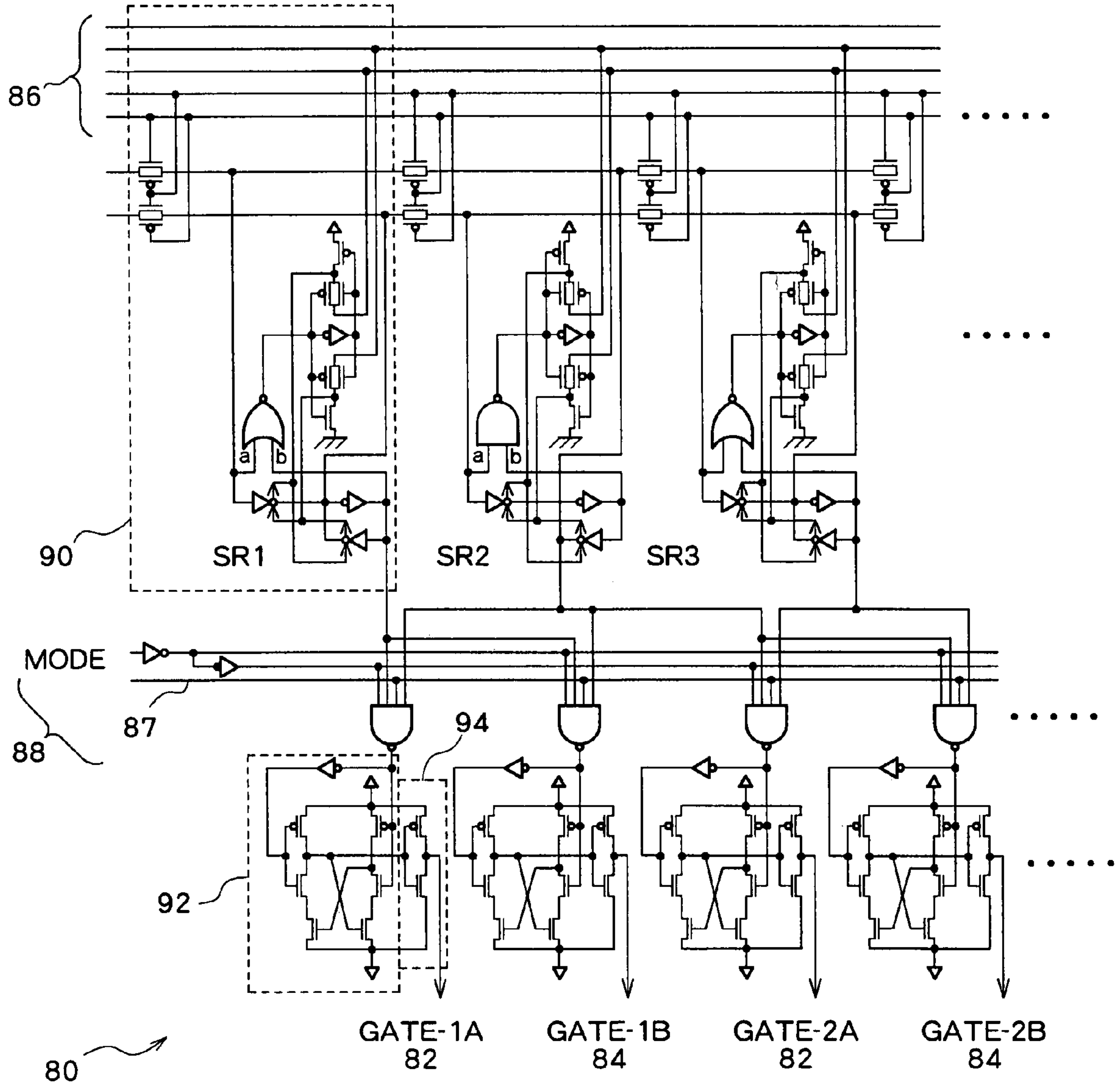
FIG. 4 is a view showing a structure of a scan line drive circuit A, B in the exemplary embodiment of the invention.

FIG. 4 shows a structure of the scan line drive circuit A, B (80). The scan line drive circuit A, B (80) generates a signal for sequentially selecting each of the first scan lines 82 and each of the second scan lines 84 based on a sequential signal 86 composed of a start signal and a clock signal. The scan line drive circuit A, B (80) includes a shift register circuit unit 90, a distribution circuit unit 88, a level shift circuit unit 92, and an output driver circuit unit 94.

The shift register circuit unit 90 is a circuit having a function of sequentially shifting the sequential signal 86 sequentially input and outputting a sequential designation pulse for designating a display pixel in scan line units. The shift register circuit units 90 are provided in the number corresponding to the number of a plurality of display pixels 42 arranged along the scan direction. In other words, when one first scan line 82 and one second scan line 84 are arranged with respect to one display pixel 42, the following relationship is satisfied: the number of first scan lines=the number of second scan lines=the number of shift register circuit units 90. Namely, one shift register circuit of the shift register circuit unit 90 is shared by the first scan line 82 and the second scan line 84, so that the scale of the scan line drive circuit A, B (80) can be reduced. The shift register circuit unit 90 can operate with a voltage ranging from 0V to +5V, for example.

The distribution circuit unit 88 is disposed after the shift register circuit unit 90 and distributes an output from each shift register circuit unit 90 to either the first scan line 82 or the second scan line 84 in accordance with a distribution signal. The distribution signal may be any signal which can be used for selecting either the first scan line 82 or the second scan line 84. For example, a special signal for performing analog display or a special signal for performing digital display can be supplied from the control IC 32.

Here, the mode switching first signal or the mode switching second signal can be used as the distribution signal. Referring to FIG. 4, in addition to an enable signal of an enable signal line 87, the mode switching first signal which is a signal of the MODE (62) is used. Because the mode switching first signal is a signal for selecting the analog display mode when the signal is at the H level and selecting the digital display mode when the signal is at the L level, the mode switching first signal can distribute the output of the shift register circuit unit 90 to the first scan line when the signal is at the H level and to the second scan line 84 when the signal is at the L level. The mode switching second signal of the XMODE (63) may be used in place of the mode switching first signal. Thus, with the use of the mode switching first signal or the mode switching second signal, the need for generating a dedicated distribution signal can be eliminated.

The level shift circuit unit 92 is a circuit having a function of converting the level and amplitude of the signal which is distributed into the level and amplitude suitable for a scan line selection signal. The level shift circuit unit 92 can be formed by using a known signal level shift circuit technology. The output drive circuit unit 94 is a buffer circuit for supplying an electric current sufficient for driving the scan lines. The level shift circuit unit 92 and the output driver circuit unit 94 are provided for each of the first scan lines 82 and each of the second scan lines 84. In other words, the following relationship can be satisfied: (a total number of the first scan lines 82 and the second scan lines 84)=the number of level shift circuit units 92=the number of output driver circuit units 94. Accordingly, the level shift circuit unit 92 and the output driver circuit unit 94 are provided individually for the first scan line 82 and the second scan line 84, and are not shared by the first and second scan lines. While the output level of the output driver circuit unit 94 varies depending of the use of the display apparatus 10, the level can be set to within a range, such as, for example, between 0V and −5V or between 0V and +8V or between 0V and +9V.

The output level of the output driver circuit unit 94, i.e. the level of the scan line selection signal can be made identical for the first scan line 82 and the second scan line 84. This allows the level shift circuit unit 92 and the output driver circuit unit 94 to be common to the first and second scan lines.

Alternatively, the output level of the output driver circuit unit 94 may be varied between that for the first scan line 82 and that for the second scan line 84, as required. For example, for the first scan line 82, in consideration of capacitor coupling with the common electrode in the case of analog display, the signal with a larger amplitude than that for the second scan line 84 in the case of static digital display is preferably set. Viewed in another way, the signal amplitude for the second scan line 84 in the case of digital display can be made smaller than the signal amplitude for the first scan line 82 in the case of analog display, so that the power consumption concerning the scan line driving can be reduced accordingly. For example, the amplitude of a scan line selection signal for the first scan line 82 can be set to a range from −4V to +9V and the amplitude of a scan line selection signal for the second scan line 84 can be set to a range from 0V to +5V or the like.

Figure 5A:
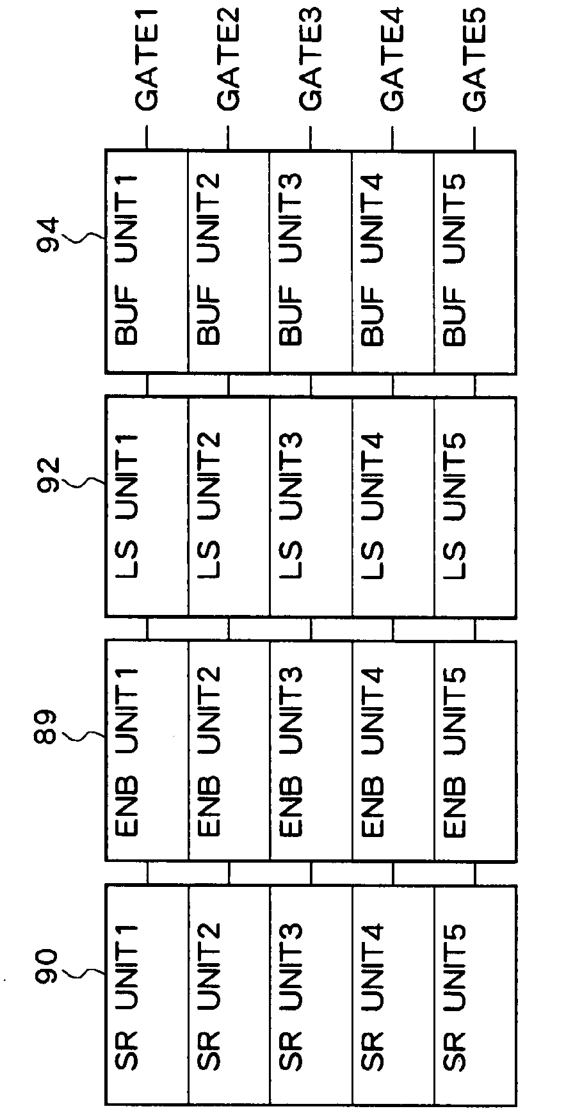
PRIOR ART Fig. 5A
FIG. 5A is a view showing a structure of a scan line drive circuit conventionally used in an active matrix liquid crystal display apparatus.
Figure 5B:
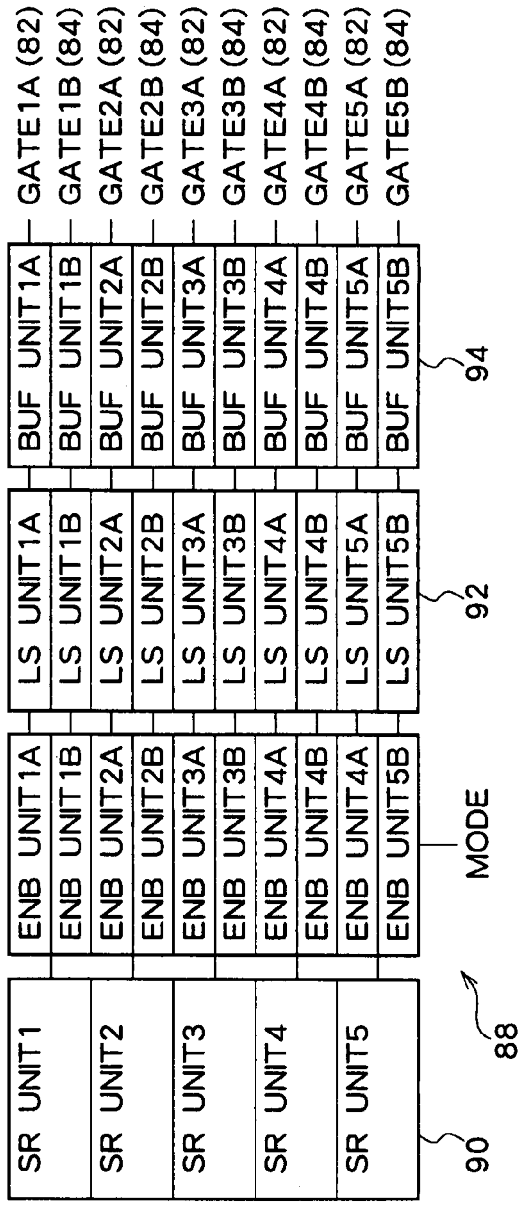
FIG. 5B is a view showing a structure of a scan line drive circuit according to the exemplary embodiment of the invention.

FIGS. 5A and 5B show a structure of a scan line drive circuit used in a general active matrix liquid crystal display apparatus and a structure of the scan line drive circuit of the invention described with reference to FIG. 4, for comparison. FIG. 5A shows a structure of a scan line drive circuit conventionally used in an active matrix liquid crystal display apparatus, in which one shift register circuit unit (SR UNIT) 90, one enable circuit unit (ENB UNIT) 89 controlled by an enable signal, one level shift circuit unit (LS UNIT) 92, and one output driver circuit unit (BUF UNIT) 94 are used for each one scan line. The shift register circuit unit 90, the level shift circuit unit 92, and the output driver circuit unit 94 are the same as those described above with reference to FIG. 4.

On the other hand, FIG. 5B shows a structure of the scan line drive circuit A, B (80) described with reference to FIG. 4, in which the shift register circuit unit (SR UNIT) 90 is shared by the first scan line (GATE1A and so on) 82 and the second scan line (GATE1B and so on )84, and the output of the shift register circuit unit 90 is distributed between the first scan line 82 and the second scan line 84 by the distribution circuit unit 88 in which a signal of the MODE is added to the enable circuit unit. Here, the distribution circuit unit 88 serves to distribute the output of the common shift register circuit unit 90 between the level shift circuit unit and the output driver circuit unit for the first scan line and the level shift circuit unit and the output driver circuit unit for the second scan line, by enabling an enable signal using a signal of the MODE.

As such, in the conventional technology shown in FIG. 5A, the shift register circuit unit 90, the enable circuit unit 89, the level shift circuit unit 92, and the output driver circuit unit 94 are required in the number corresponding to the number of scan lines, respectively. According to the structure shown in FIG. 4, on the other hand, because the shift register circuit unit 90 is shared by the first scan line and the second scan line as shown in FIG. 5B, the number of the shift register circuit units 90 can be decreased to one half the total number of scan lines. As a result, the overall scale of the scan line drive circuit A, B can be reduced.

Figure 6A:
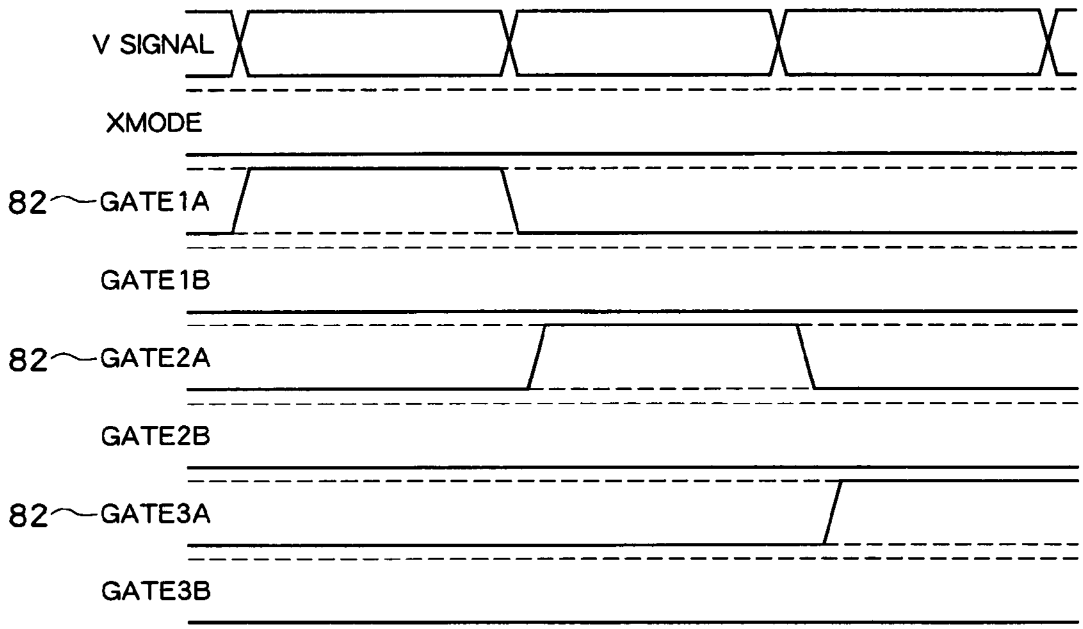
FIG. 6A is a view for explaining effects of the scan line drive circuit A, B when a mode switching second signal is at an L level in the exemplary embodiment of the invention.
Figure 6B:
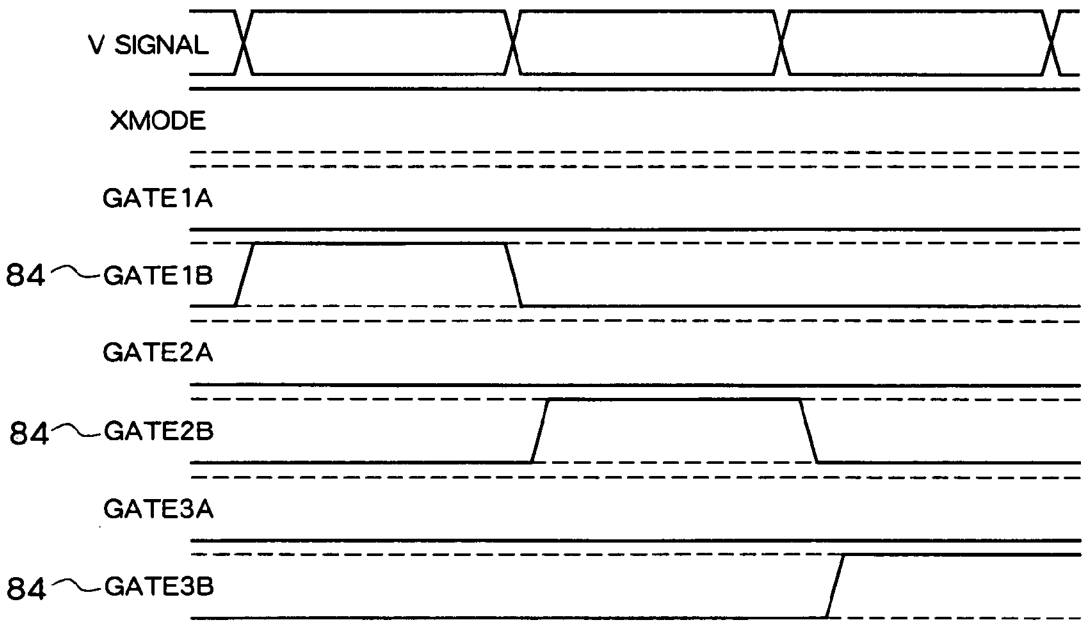
FIG. 6B is a view for explaining effects of the scan line drive circuit A, B when a mode switching second signal is at an H level in the exemplary embodiment of the invention.

FIGS. 6A and 6B are views for explaining the operation of the scan line drive circuit A, B. Specifically, FIGS. 6A and 6B show how each of the first scan lines (GATE1A or the like) and each of the second scan lines (GATE1B or the like) is selected when the mode switching second signal in the XMODE is at the L level and at the H level, respectively. When the mode switching second signal in the XMODE is at the L level, each of the first scan lines (GATE1A or the like) is sequentially selected, as shown in FIG. 6A. When, on the other hand, the mode switching second signal in the XMODE is at the H level, each of the second scan lines (GATE1B or the like) is sequentially selected, as shown in FIG. 6B.

Referring back to FIG. 2, the data line drive circuit 70 is a circuit having a function of inputting an image signal corresponding to each gray level, i.e. a video signal, to the data signal line 72, as described above. Here, a data line drive circuit for use in a general active matrix liquid crystal display apparatus can be used without any changes.

Figure 7:
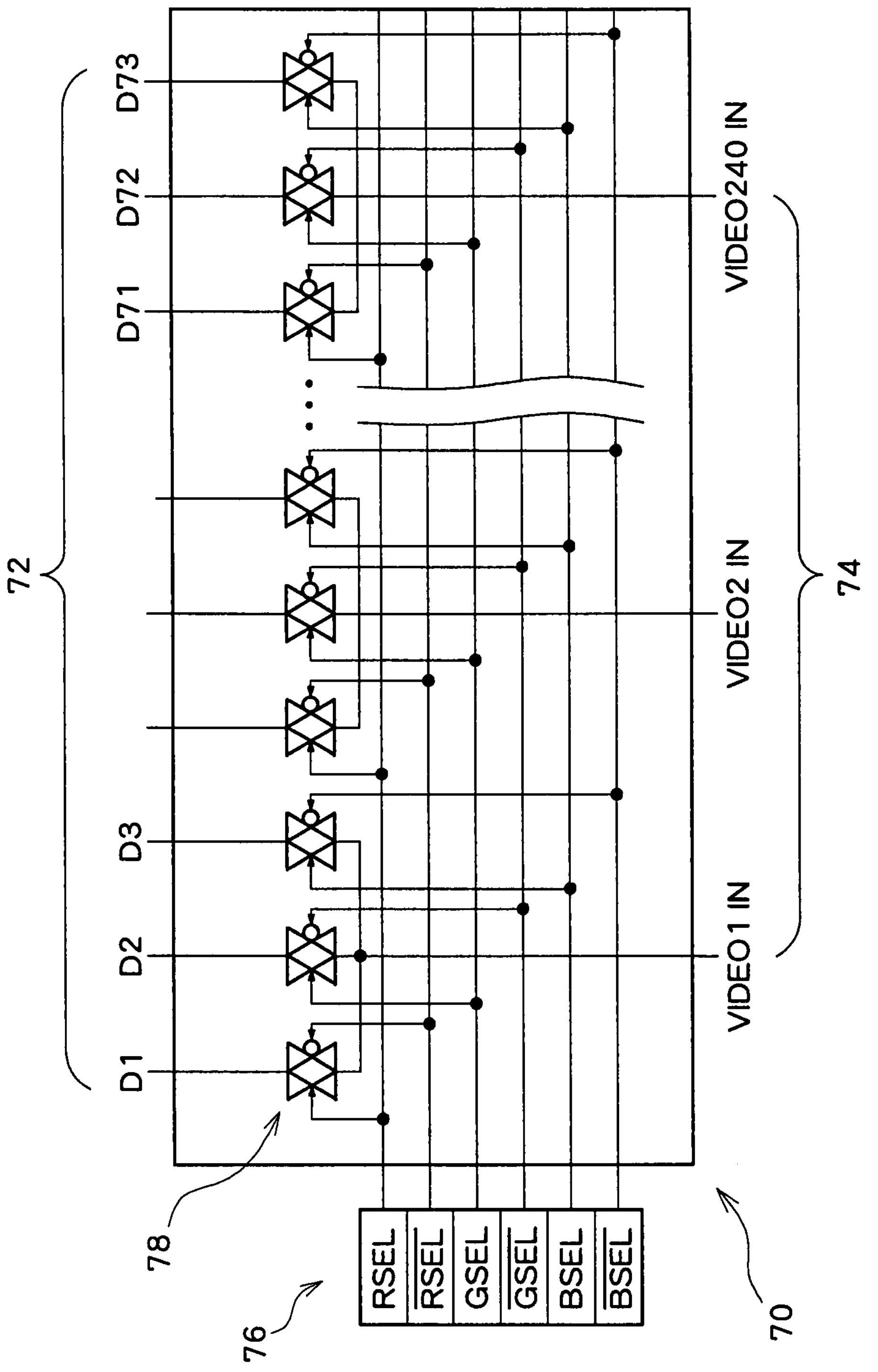
FIG. 7 is a view showing a structure of a data line drive circuit according to the exemplary embodiment of the invention.

FIG. 7 shows a structure of the data line drive circuit 70. The data line drive circuit 70 is mainly formed of a plurality of demultiplexers 78, to which video signal lines 74 which are externally supplied and select signal lines 76 which are similarly externally supplied are connected. A video signal is divided into three components, which are R, G, and B, by means of a select signal, which are then output to the data signal lines 72 of the respective display pixels which are sub pixels for color display.

The operation of the display apparatus 10 having the above-described structure will be described. The display apparatus, during normal operation, performs analog display in full color. At this time, the control IC 32 sets mode switching to the analog display mode, and also sets the mode switching first signal in the MODE (62) at the H level and sets the mode switching second signal in the XMODE (63) at the L level. These signals are then supplied to each display pixel 42 and the scan line drive circuit A, B (80). In the scan line drive circuit A, B (80), the distribution circuit unit 88 selects the first scan line 82 side, and a scan line selection signal is output such that the first scan line 82 of each display pixel 42 is selected. Consequently, in each display pixel 42, the N channel transistor 44 is turned ON, and also the N channel transistor 48 is turned ON by the mode switching first signal, to thereby actuate the first display circuit for performing analog display. Meanwhile, the N channel transistor 46 on the digital display side is turned OFF, and because the mode switching second signal in XMODE (63) is at the L level, the second display circuit side is completely disconnected from the first display circuit side.

When the display apparatus 10 is in a standby state, the control IC 32 sets mode switching to the digital display mode, and also sets the mode switching first signal in the MODE (62) at the L level and sets the mode switching second signal in the XMODE (63) at the H level. These signals are then supplied to each display pixel 42 and the scan line drive circuit A, B (80). In the scan line drive circuit A, B (80), the distribution circuit unit 88 selects the second scan line 84 side, and a scan line selection signal is output such that the second scan line 84 of each display pixel 42 is selected. Consequently, in each display pixel 42, the N channel transistor 46 is turned ON and an image signal is held as binary data in the holding circuit 56. Further, the mode switching second signal places the transmission gate 50 in a connected state to thereby actuate the second display circuit for performing digital display. Meanwhile, the N channel transistor 44 on the analog display side is turned OFF, and because the mode switching first signal in MODE (62) is at the L level, the first display circuit side is completely disconnected from the second display circuit side.

As described above, both the analog display mode and the digital display mode can be achieved in a single display apparatus 10, and power consumption concerning the standby state can be reduced. Further, because the shift register circuit unit 90 is shared by the first scan lines 82 and the second scan lines 84 in the scan line drive circuit A, B (80), the scale of the structure can be decreased even when two types of scan lines are used. In addition, the amplitude of the scan line selection signal can be set to different levels between that for the first scan line 82 and that for the second scan line 84, which results in a further decrease in power consumption concerning scan line driving.

Exemplary Embodiment 2

Figure 8:
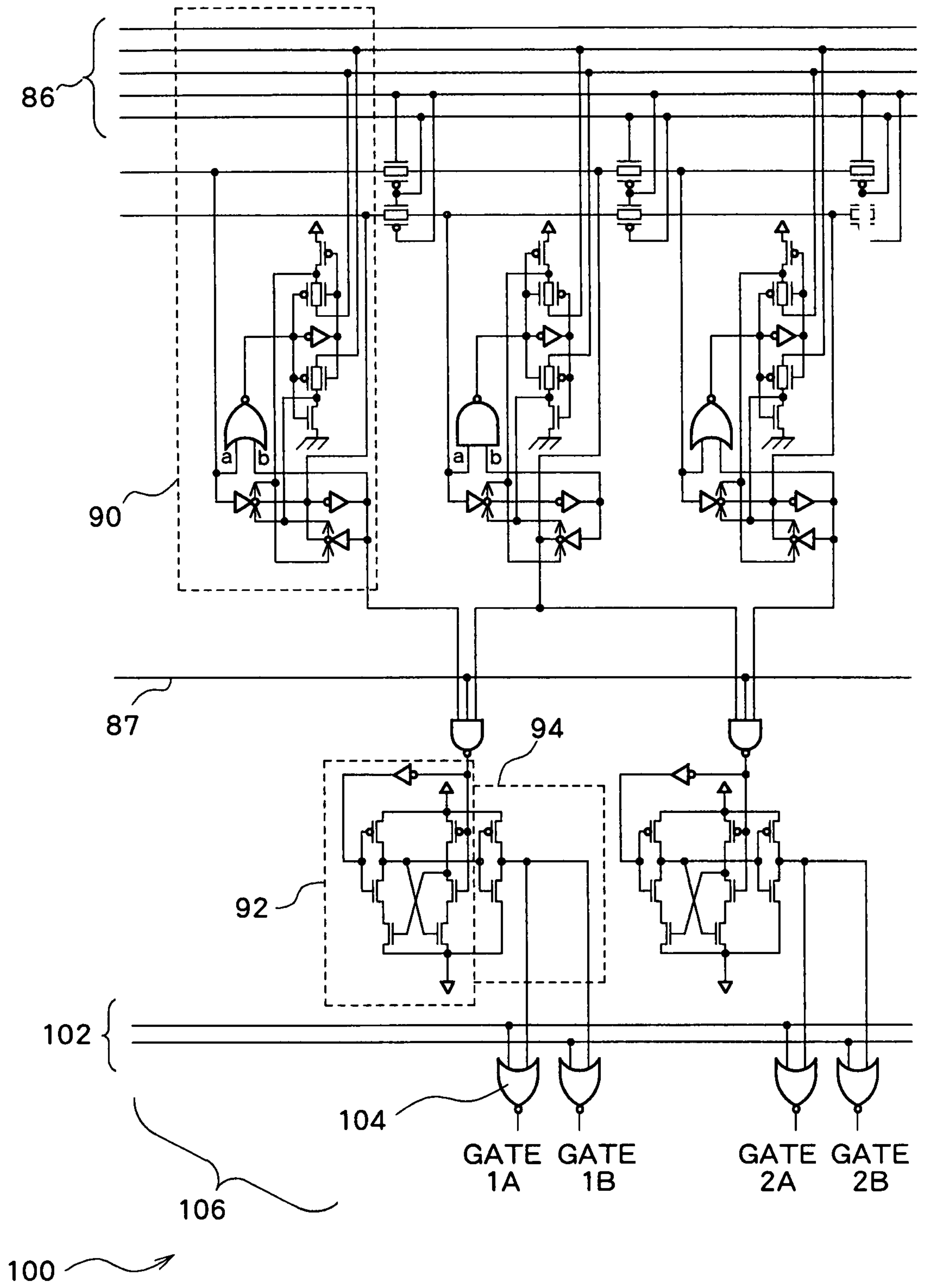
FIG. 8 is a view showing a structure of a scan line drive circuit A, B according to another exemplary embodiment of the invention.

In the example described above, in the scan line drive circuit A, B (80), the distribution circuit unit 88 is disposed between the shift register circuit unit 90 and the level shift circuit unit 92. Alternatively, in the scan line drive circuit A, B (80), the distribution circuit unit can be provided after the output driver circuit unit 94. FIG. 8 shows a scan line drive circuit A, B (100) having such a structure. In FIG. 8, elements identical to those in FIG. 4 are designated by the same numerals, and detailed description thereof will not be provided.

Specifically, in the scan line drive circuit A, B (100), the shift register circuit unit 90, the level shift circuit unit 92, and the output driver circuit unit 94 are shared by the first scan lines and the second scan lines, and the output driver circuit unit 94 includes two outputs. A distribution circuit unit 106 including a NOR circuit 104 distributes the two outputs to the first scan lines (GATE1A or the like) and the second scan lines (GATE1B or the like) by means of a pair of distribution signals 102 having different polarities. As the distribution signals, any dedicated signals may be used, or the signals in the MODE or the XMODE may be used. Here, connection between the shift register circuit unit 90 and the level shift circuit unit 92 is controlled by the enable signal line 87.

With the above structure, circuit portions shared by the first scan lines and the second scan lines are increased, so that the whole scale of the scan line drive circuit A, B (80) can be further reduced.

Exemplary Embodiment 3

Figure 9:
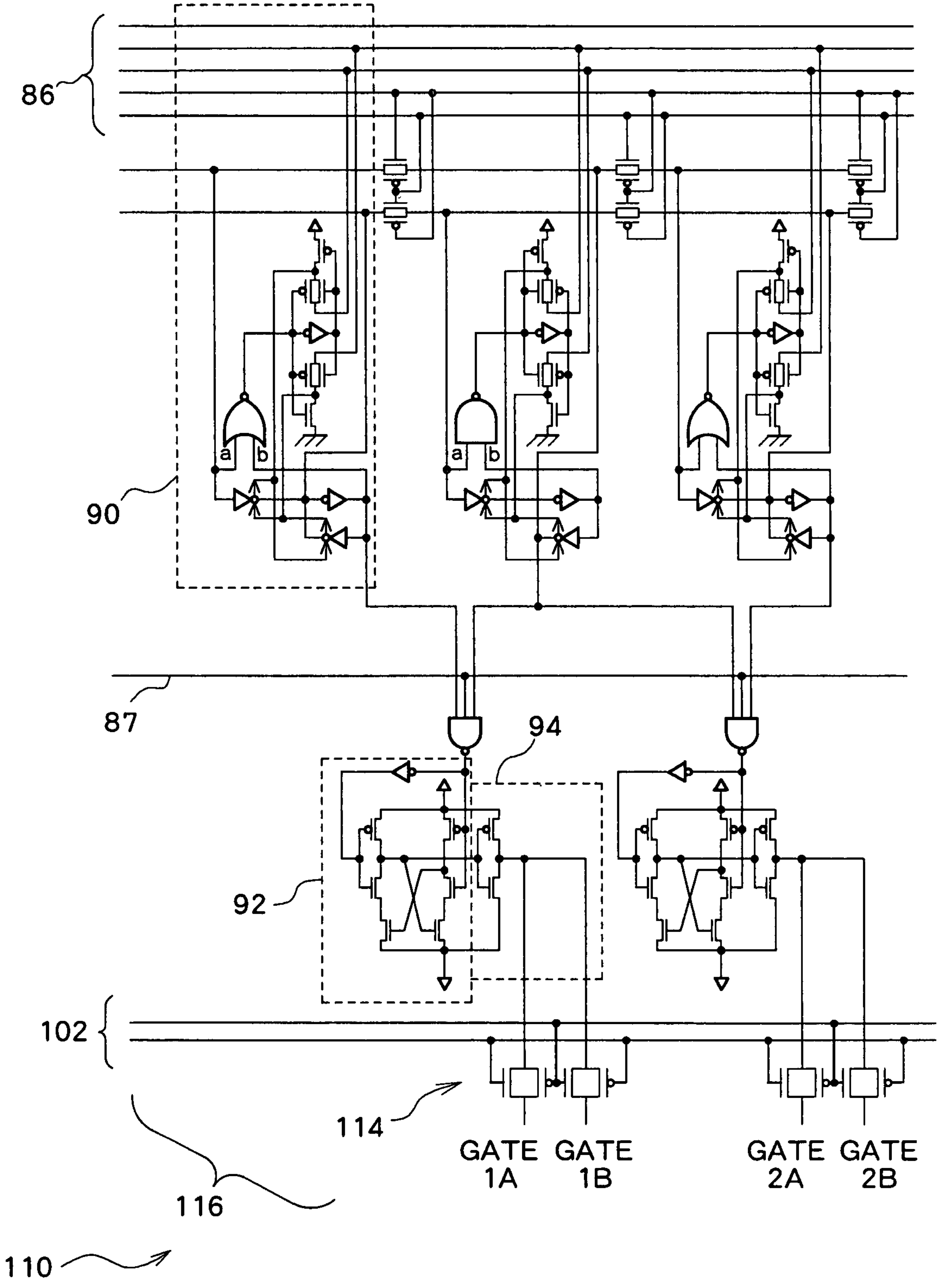
FIG. 9 is a view showing a structure of a scan line drive circuit A, B according to still another exemplary embodiment of the invention.

The NOR circuit in FIG. 8 can be replaced by other circuits having a signal distribution function. FIG. 9 shows a structure of a scan line drive circuit A, B (110) including a distribution circuit unit 116 using a transmission gate 114. In FIG. 9, elements similar to those in FIGS. 4 and 8 are designated by the same numerals and will not be described in detail. The structure shown in FIG. 9 differs from that shown in FIG. 8 only in that the transmission gate 114 is provided in place of the NOR circuit 104. With the structure shown in FIG. 9, as in the structure of FIG. 8, the circuit portions shared by the first scan lines and the second scan lines are increased, so that the whole scale of the scan line drive circuit A, B (110) can be reduced.

Exemplary Embodiment 4

In a display apparatus capable of achieving both analog display and digital display, a structure and an operation which enables digital display in an arbitrary region will be described.

Figure 10:
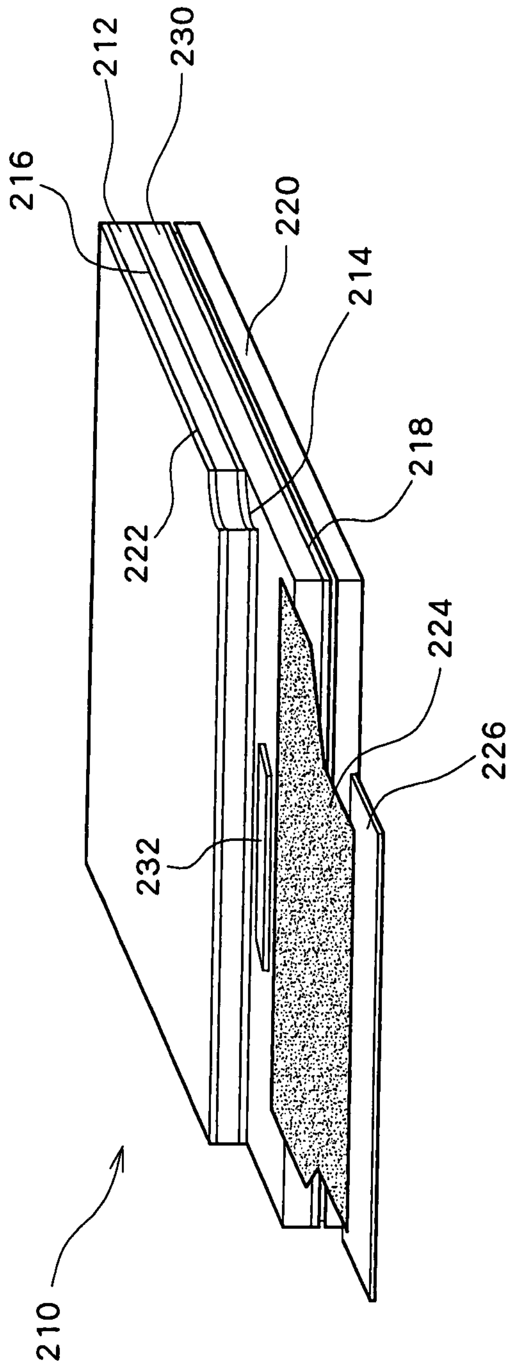
FIG. 10 is a perspective view of a display apparatus according to a further exemplary embodiment of the invention.

FIG. 10 is a perspective view showing a display apparatus 210 in which display can be performed in any arbitrary region. The display apparatus 210 is an active matrix type liquid crystal display apparatus which includes a lower glass substrate 230, an upper glass substrate 212, a seal member 216 for sealing liquid crystal 214 between these glass substrates, backlight 220 disposed on the bottom surface side of the lower glass substrate 230 via a light guide element 218, and a polarizer element 222 disposed on the top surface side of the upper glass substrate 212. The liquid crystal display apparatus 210 can be illuminated by the backlight. A control IC 232 is mounted on the lower glass substrate 220 by using the COG technology, and is connected with an external circuit substrate 226 by means of an appropriate flexible circuit substrate 224 such as an FPC (Flexible Print Circuit).

The upper glass substrate 212, which sandwiches the liquid crystal 214 together with the lower glass substrate 230 and applies a predetermined drive voltage to both sides of the liquid crystal, is also referred to as an opposing substrate, because the upper glass substrate 212 is opposed to the lower glass substrate 230. On the upper glass substrate 212, a common electrode which is an opposing electrode is provided so as to oppose a pixel electrode provided on the lower glass substrate 230, and a common electrode potential is applied to the common electrode.

The lower glass substrate 230 is a transparent substrate on which a plurality of scan lines and a plurality of data signal lines are arranged in a lattice shape and on which, in each lattice region, a display pixel and a poly-silicon TFT serving as a switching element are disposed. Here, two types of scan lines are used. One of the two types of scan lines is the same as a scan line of a general active matrix liquid crystal display apparatus. Specifically, when this type of scan line is used, due to a function of the switching element, an image signal from a data signal line is supplied to a pixel electrode of each display pixel selected by the scan line and liquid crystal molecules sealed between the upper glass substrate 212 and the lower glass substrate 230 are driven in accordance with a potential difference between the pixel electrode and the opposing electrode provided on the upper glass substrate 212, thereby enabling display. The other type of scan line is used for displaying a still image.

As described above, of the two types of scan lines which are used, one type of scan line is the same as the scan line of a general active matrix liquid crystal apparatus and is used for halftone display, moving image display, and so on. When the display apparatus is a color display apparatus, this type of scan line is used for full color display. The other type of scan line is used for displaying a still image while suppressing power consumption concerning image display by using a holding circuit which is capable of holding binary data as will de described below. In order to differentiate between these two types of display, the former can be referred to as “analog display” and the latter can be referred to as “digital display”. These two types of display can also be referred to as “dynamic display” and “static display”, or, in the case of color display, as “full color display” and “still image display”. In the following description, the term “analog display” and “digital display” will be used primarily, although other names will also be used as appropriate for clarity of the description.

Further, in order to differentiate between the two types of scan lines, the type of scan line for use in analog display will be referred to as a first scan line, while the type of scan line for use in digital display will be referred to as a second scan line. When both analog display and digital display are performed for each display pixel, two scan lines, which are the first and second scan lines, and one data signal line are provided for each display pixel.

Figure 11:
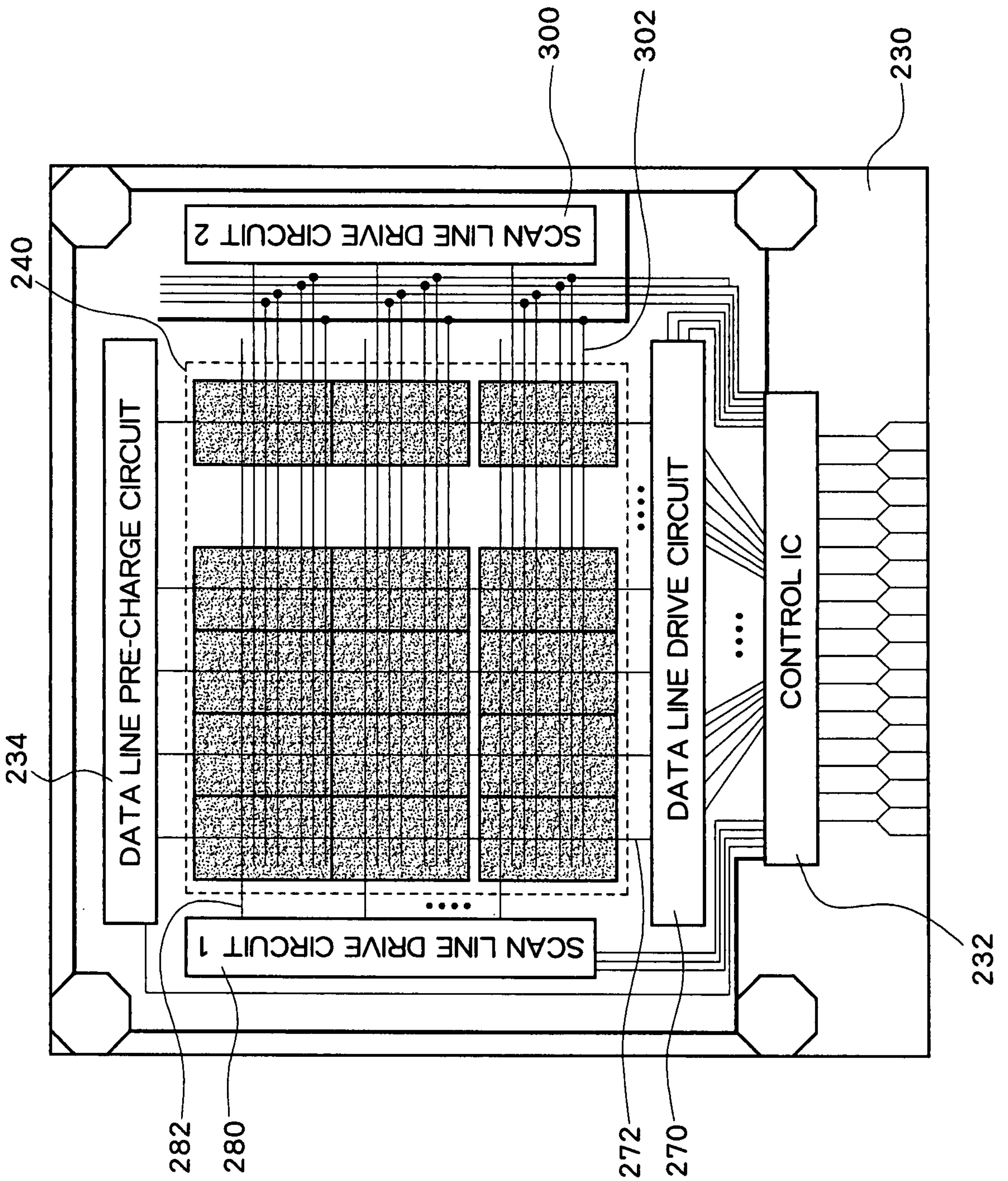
FIG. 11 is a view showing the arrangement of each element on a lower glass substrate according to the exemplary embodiment illustrated in FIG. 10.

FIG. 11 shows an arrangement of each element on the lower glass substrate 230. A display region 240 having a substantially rectangular shape in its plan view is provided in the center portion of the lower glass substrate 230. In the peripheral portions of the display region 240, a scan line drive circuit 1 (280) and a scan line drive circuit 2 (300) for sequentially selecting each of a first scan line 282 and a second scan line 302, respectively; a data line drive circuit 270 for inputting an image signal corresponding to each gray level, i.e. a video signal, to a data signal line 272; and a data line pre-charge circuit 234 for inputting an intermediate potential of a video amplitude before the video signal is input to the data signal line 272, are provided. The scan line drive circuit 1 (280), the scan line drive circuit 2 (300), the data line drive circuit 270, and the data line pre-charge circuit 234, are connected to the control IC 232.

The scan line drive circuit 1 (280), the scan line drive circuit 2 (300), the data line drive circuit 270, and the data line pre-charge circuit 234 are formed on the lower glass substrate 230 by using TFTs which are formed by poly-silicon transistor forming technology as with the TFTs in the display region 240. As such, the lower glass substrate 230 is a SOG (System On Glass) substrate in which active elements are formed.

While a scan line drive circuit which is used for a general active matrix liquid crystal display apparatus can be used as the scan line drive circuit 1 (280) and the scan line drive circuit 2 (300), it is preferable to use a scan line drive circuit which is suitable for discrimination between analog display and digital display, in order to reduce power consumption related to scan line driving. Here, FIG. 11 shows the scan line drive circuit 1 (280) for use in analog display as a drive circuit which uses conventional shift registers for sequentially selecting the first scan lines 282 and the scan line drive circuit 2 (300) for use in digital display as a drive circuit using a decoder which can select the second scan lines 302 at random. The scan line drive circuit 1 (280) and the scan line drive circuit 2 (300) will be described in detail below.

A data line drive circuit which is used for a general active matrix liquid crystal display apparatus can be used as the data line drive circuit 270, which will be described in detail below.

The control IC 232, which is an LSI (Large Scale Integrated circuit) chip having a function of controlling the operations of the scan line drive circuit 1 (280), the scan line drive circuit 2 (300), the data line drive circuit 270, the data line pre-charge circuit 234, and so on, is mounted by the COG technology on the line pattern provided on the lower glass substrate 230. This line pattern extends to the scan line drive circuit 1 (280), the scan line drive circuit 2 (300), the data line drive circuit 270, the data line pre-charge circuit 234, and so on, and also extends to the end portion of the lower glass substrate 230, where the line pattern is connected to the flexible circuit substrate 224 as described above with reference to FIG. 10.

The display region 240 is a region in which a plurality of display pixels 242 are arranged in a matrix. In this display region 240, a plurality of first scan lines 282 from the scan line drive circuit 1 (280) and a plurality of second scan lines 302 from the scan line drive circuit (300) are arranged along one direction of the lower glass substrate 230 in its plan configuration, and a plurality of data signal lines 272 from the data line drive circuit 270 are arranged along a direction intersecting the one direction, such as along a direction orthogonal to the one direction, for example. In the example shown in FIG. 11, the first scan lines 282 and the second scan lines 302 are arranged along the left-right direction on the sheet plane, and the data signal lines 272 are arranged along the top-bottom direction on the sheet plane. The first scan lines 282 and the second scan lines 302 are arranged in pairs. The display region 240 is segmented into a plurality of lattice regions by these pairs of scan lines and the data signal lines 272, and the display pixel 242 is disposed in each lattice region. Here, sub pixels are used for R, G, B, respectively, in the case of a color display apparatus, and in the following description, this sub pixel will be described as the display pixel 242.

Figure 12:
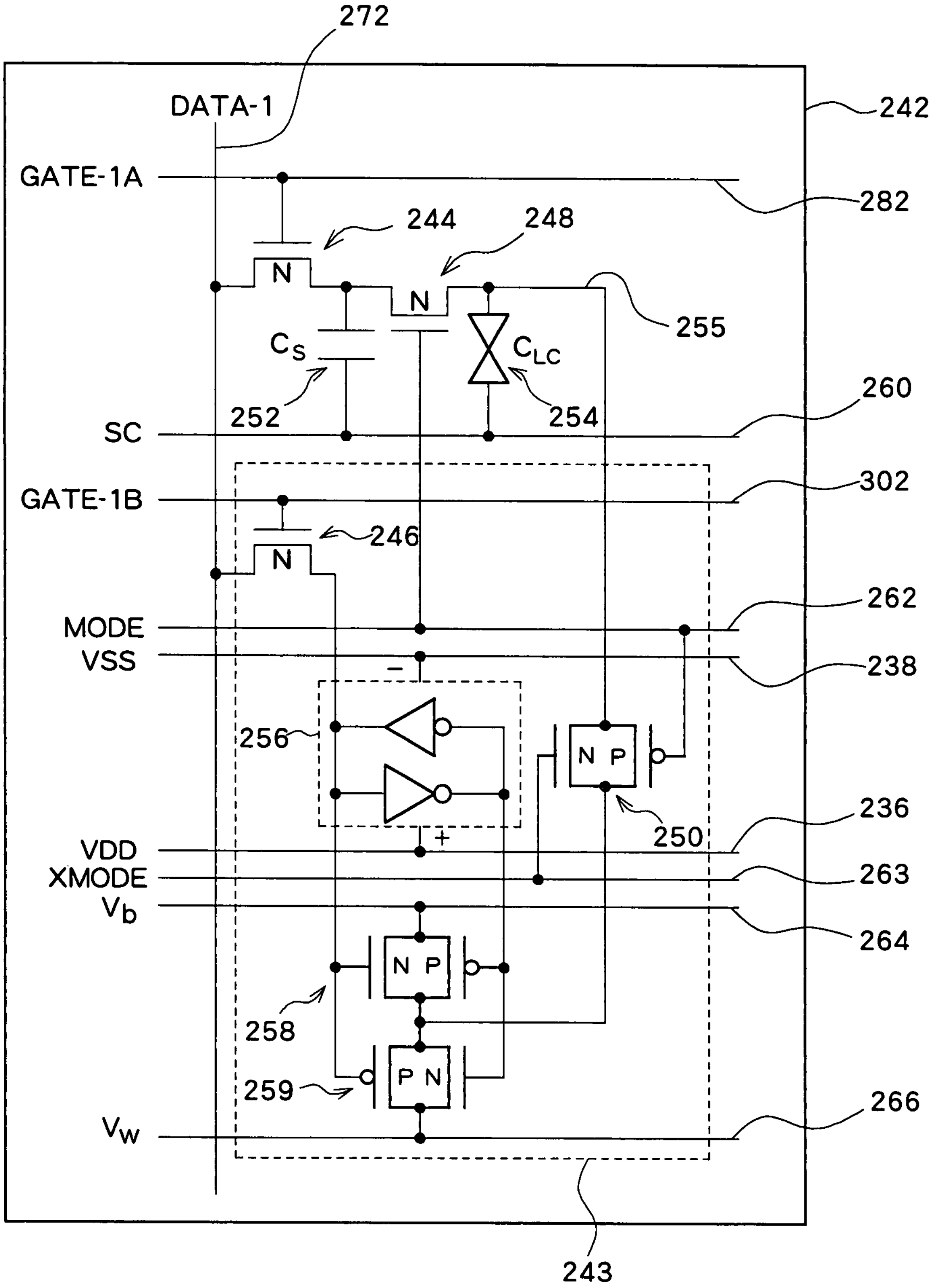
FIG. 12 is a view for explaining a structure of a display pixel according to the exemplary embodiment illustrated in FIG. 10.

FIG. 12 is a view for explaining the structure of the display pixel 242. In the following description, reference numerals shown in FIGS. 10 and 11 will be used. In FIG. 12, a single pixel located on the upper left corner of the display region 240 on the sheet plane of FIG. 11 is shown as a representative example. More specifically, when, in order to discriminate among a plurality of display pixels 242, the position of a lattice region defined by the first scan line 282, the second scan line 302, and the data signal line 272 is represented by coordinates (X,Y), with the direction to the right being designated as the X direction, the direction to the bottom being designated as the Y direction, and the upper left point on the sheet plane being designated as an origin in FIG. 11, the display pixel 242 shown in FIG. 12 is located at a position (1,1) in the display region 240. Similarly, when, in order to discriminate among a plurality of first scan lines 282, a plurality of second scan lines 302, and a plurality of data signal lines 272, respectively, numbers are assigned to these lines in ascending order along the above-described X and Y directions, respectively, with the upper left point in FIG. 11 being designated as an origin, the first scan line 282, the second scan line 302, and the data signal line 272 corresponding to the display pixel 242 shown in FIG. 12 are designated by 1. In order to indicate this, in FIG. 12, the first scan line 282 is denoted as GATE-1A, the second scan line 302 is denoted as GATE-1B, and the data signal line 272 is denoted as DATA-1.

In FIG. 12, the liquid crystal 214 for performing display is denoted as a liquid crystal capacitor $C_{LC}$ (254). The liquid crystal capacitor $C_{LC}$ (254) is a capacitor between a pixel electrode line 255 and a common electrode signal line 260 which is an opposing electrode. Here, the common electrode line 260 is denoted as SC.

Each signal line or the like in FIG. 12 will be described first. VDD (236) and VSS (238) are a power source voltage line and a ground line of the control IC 232, respectively, and are set to VDD=+5V and VSS=0V, for example.

The common electrode signal line 260 is a signal line for transmitting a common electrode signal SC to be applied to the common electrode which is an opposing electrode provided on the upper glass substrate 212, as described above. For the purpose of alternating current driving of the liquid crystal 214, a signal having a rectangular waveform, which changes in the range of 0V to +4V, for example, can be used as the common electrode signal SC.

Vb (264) and Vx (266) are signal lines which are used for alternate current driving the liquid crystal 214 during digital display. Specifically, Vw (266) is a signal line for transmitting a potential which causes the liquid crystal 214 to perform white display when the signal thereof is applied to the pixel electrode line 255, and transmits the same signal as the common electrode signal in the common electrode signal line 260. Vb (264) is a signal line for transmitting a potential which causes the liquid crystal 214 to perform black display when the signal thereof is applied to the pixel electrode line 255, and transmits an inverted signal of the common electrode signal in the common electrode signal line 260.

MODE (262) and XMODE (263) are signal lines which transmit two mode switching signals for switching between an analog display mode and a digital display mode. In order to differentiate between the two mode switching signals, a signal in the MODE (262) can be referred to as a mode switching first signal and a signal in the XMODE (263) can be referred to as a mode switching second signal. The mode switching first signal in the MODE (262) and the mode switching second signal in the XMODE (263) are inverted with respect to each other. When the mode switching first signal in the MODE (262) is at an H level and the mode switching second signal in the XMODE (263) is at an L level, the analog display mode can be achieved, and when the mode switching first signal in the MODE (262) is at an L level and the mode switching second signal in the XMODE (263) is at an H level, the digital display mode can be achieved.

The mode switching first signal in the MODE (262) and the mode switching second signal in the XMODE (263), having opposite polarities as described above, also have different amplitudes and mutually asymmetric waveforms, because of the following functional difference between the two mode switching signals. Specifically, while, with the signal in the MODE (262) being at the H level, an N channel transistor 248 is turned ON for transmitting an analog image signal to the pixel electrode line 255, with the signal in the XMODE (263) at the H level, switching between two potential levels in the Vb (264) or the Vw (266) is simply performed. For example, with regard to switching between the analog display mode and the digital display mode, the levels of the mode switching first signal can be set as H level=+9V and L level=0V, and the levels of the mode switching second signal can be set as H level=+4V and L level=−4V.

Referring to FIG. 12, each element constituting the display pixel 242 will be described. An N channel transistor 244 is an element which operates by means of a scan line selection signal of the first scan line 282. Further, an N channel transistor 246 is an element which operates by means of a scan line selection signal of the second scan line 284. In order to discriminate between these two elements, the N channel transistor 244 can be referred to as a first switch circuit and the N channel transistor 246 can be referred to as a second switch circuit.

Another N channel transistor 248 is further connected between the N channel transistor 244, i.e. the first switch circuit, and the pixel electrode line 255. This N channel transistor 248 is an element which operates by the mode switching first signal in the MODE (262) and can be referred to as a third switch circuit. When both the N channel transistor 244 which is the first switch circuit and the N channel transistor 248 which is the third switch circuit are turned ON, that is, when the first scan line 282 is selected by a scan line selection signal and also the analog display mode is selected by the mode switching first signal, an image signal data on the data signal line 272, i.e. a video signal data, is transmitted to the pixel electrode line 255 and written in the liquid crystal 214.

Here, with regard to the display pixel 242, if it is assumed that a circuit for analog display which sequentially supplies an image signal sequentially input from the data signal line 272 to the pixel electrode line 255 of the display pixel 242 is designated as a first display circuit, the liquid crystal capacitor $C_{LC}$ 254 and the storage capacitor $C_S$ 252 correspond to this first display circuit in a narrow sense, and the first display circuit can further include, in a broad sense, the N channel transistors 244 and 248.

A holding circuit 256 which is formed by two inverters connected in a ring shape and which is capable of statically holding data is connected on the output side of the N channel transistor 246 which is the second switch circuit. The holding circuit 256, which has a function of statically holding image signal data written therein, is a static memory which consumes substantially no electric power when holding data.

Further, two pairs of transmission gates 258 and 259 each provided between output terminals of the two inverters forming the holding circuit 256 have a function of supplying a signal of the Vb (264) or a signal of the Vw (266) to a transmission gate 250, in accordance with a signal held by the holding circuit 250. Because the transmission gate 250 further connects to the pixel electrode line 255, the transmission gates 258 and 259 have a function of a pixel electrode potential selection switch which selects whether the potential to be supplied to the pixel electrode line 255 is at a signal level of Vb (264) or a signal level of Vw (266) in accordance with the data stored in the holding circuit 256.

The transmission gate 250 is a circuit which is operated by the mutually inverted signals, the mode switching second signal of the XMODE (263) and the mode switching first signal of the MODE (262), and can be referred to as a fourth switch circuit. The transmission gate 250, i.e. the fourth switch circuit, has a function of supplying a signal of Vb (264) or a signal of Vw (266) which is an output of the two pairs of the transmission gates 258 and 259 to the pixel electrode line 255. Specifically, when the XMODE (263) is at an H level and the MODE (262) is at an L level, the transmission gate 250 supplies a signal of Vb (264) or a signal of Vw (266) to the pixel electrode line 255 in accordance with the signal held by the holding circuit 256. Because the signal of Vw (266) is the same as SC of the common electrode signal line 260 and the signal of Vb (264) is an inverted signal of SC as described above, the liquid crystal 214 provided between the pixel electrode line 255 and the common electrode signal line 260 can be driven by an alternate current with regard to the signal held in the holding circuit 256. More specifically, the liquid crystal 214 can display a binary still image corresponding to the signal held by the holding circuit 256.

Here, with regard to the display pixel 242, if a circuit for digital display which includes the holding circuit 256 for holding an image signal and supplies a voltage in accordance with the signal held by the holding circuit 256 to the pixel electrode line 255 is referred to as a second display circuit, the holding circuit 256 corresponds to the second display circuit in a narrow sense, and further, in a broad sense, a circuit further including the N channel transistor 246, the holding circuit 256, the transmission gates 258 and 259, and the transmission gate 250 can be referred to as the second display circuit. In FIG. 12, a circuit portion 243 enclosed by the dotted line corresponds to the second display circuit in a broad sense. Here, a circuit portion of the display pixel 242 other than the circuit portion 243 enclosed by the dotted line corresponds, in a broad sense, to the first display circuit as described above.

Further, because the N channel transistor 248 is operated by the mode switching first signal in the MODE (262) and the transmission gate 250 is operated by the mode switching second signal in XMODE (263) in such a manner that these components have a function of switching between the analog display mode and the digital display mode, these circuit portions can be collectively referred to as a mode switch circuit.

As described above, with regard to each display pixel 242 of the display apparatus 210, the first scan line 282 or the second scan line 302 is selected by a predetermined scan line selection signal, an image signal from the data signal line 272 is received, the analog display mode or the digital display mode is selected by the mode switching first signal and the mode switching second signal to thereby actuate the first display circuit or the second display circuit so that analog display or digital display can be achieved.

Referring again to FIG. 11, the scan line drive circuit 1 (280) and the scan line drive circuit 2 (300) will be described. Both the scan line drive circuit 1 (280) and the scan line drive circuit 2 (300) are circuits having a function of generating a scan line selection signal. More specifically, the scan line drive circuit 1 (280) generates a scan line selection signal for the first scan line 282, and the scan line drive circuit 2 (300) generates a scan line selection signal for the second scan line 302. In this sense, the scan line drive circuit 1 (280) for driving the first scan lines can be referred to as a first scan line drive circuit, and the scan line drive circuit 2 (300) for driving the second scan lines can be referred to as a second scan line drive circuit.

In FIG. 11, the scan line drive circuit 1 (280) and the scan line drive circuit 2 (300) are each disposed on one of a pair of opposing sides of the display region 240. It is obvious, of course, that both the scan line drive circuit 1 (280) and the scan line drive circuit 2 (300) may be disposed on one side of the display region, or that one of the scan line drive circuits may be disposed on one of arbitrary two sides of the display region 240 and the other may be disposed on the other side.

As described above, the scan line drive circuit 1 (280) for use in analog display has a structure of a drive circuit using a conventional shift register which sequentially selects the first scan lines 282. The scan line drive circuit 2 (300) for use in digital display has a structure of a drive circuit using a decoder capable of selecting the second scan lines 302 at random.

Figure 13:
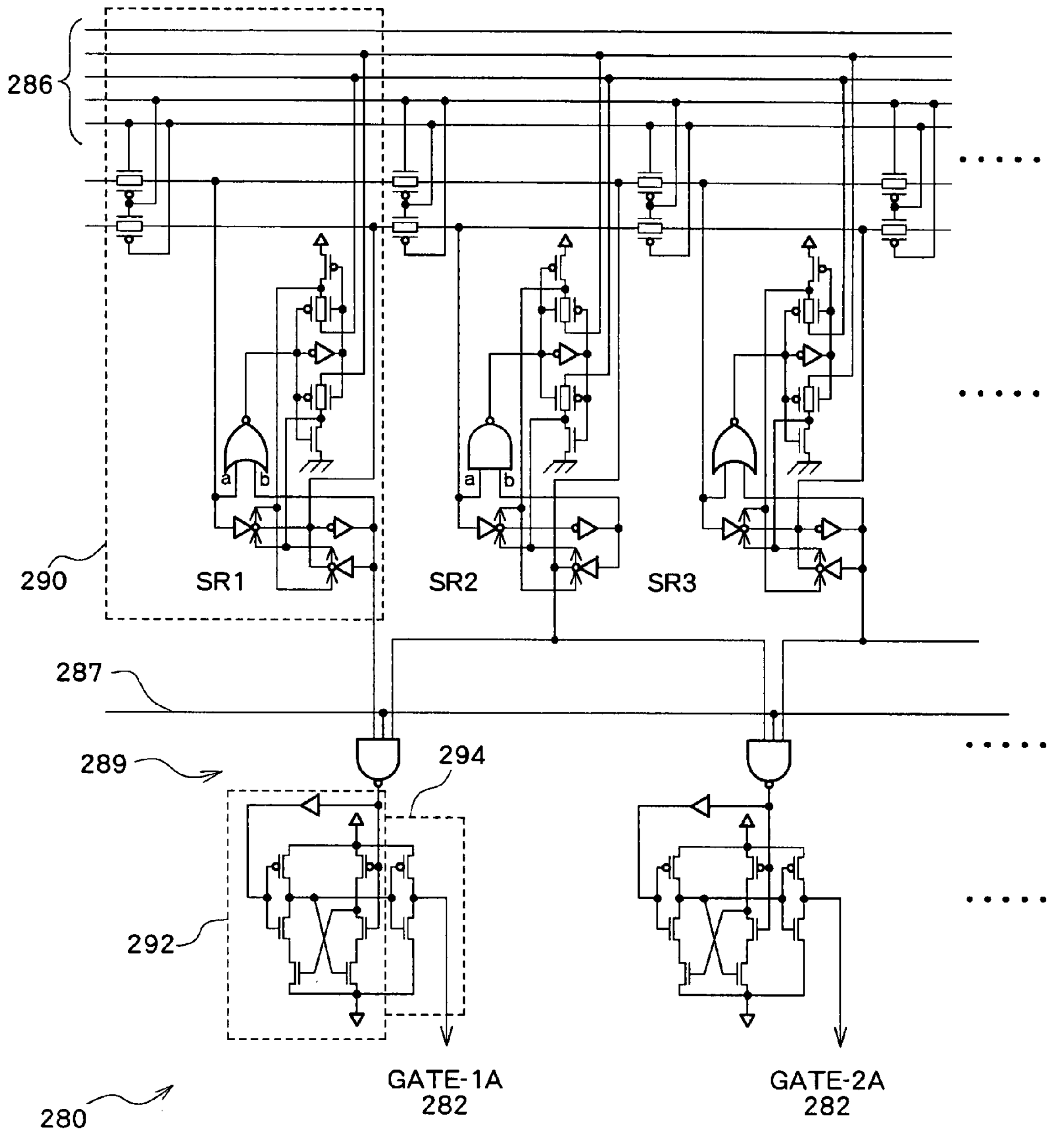
FIG. 13 is a view showing a structure of a scan line drive circuit according to the exemplary embodiment illustrated in FIG. 10.

FIG. 13 shows a structure of the scan line drive circuit 1 (280). The scan line drive circuit 1 (280) generates a signal for sequentially selecting each of the first scan lines 282 based on a sequential signal 286 composed of a start signal and a clock signal. The scan line drive circuit 1 (280) includes a shift register circuit unit 290, an enable circuit unit 289, a level shift circuit unit 292, and an output driver circuit unit 294.

The shift register circuit unit 290 is a circuit having a function of sequentially shifting the sequential signal 286 sequentially input and outputting a sequential designation pulse for designating a display pixel in scan line units. The shift register circuit unit 290 can operate with a voltage ranging from 0V to +5V, for example.

The enable circuit unit 289 is disposed after the shift register circuit unit 290 and distributes an output from each shift register circuit unit 290 to the level shift circuit unit 292 and the output driver circuit unit 294 for each first scan line 282, in accordance with the level of an enable signal of an enable signal line 287. Specifically, the enable circuit unit 289 can be formed by a NAND circuit to which the enable signal line 287 is connected.

The level shift circuit unit 292 is provided after the enable circuit unit 289, and converts the level and amplitude of an output signal of the enable circuit unit 289 into the level and amplitude suitable for a scan line selection signal. The level shift circuit unit 292 can be formed by using known signal level shift circuit technology. The output driver circuit unit 294 is a buffer circuit which supplies an electric current sufficient for driving the scan line. While the output level of the output driver circuit unit 294 varies depending of the use of the display apparatus 210, the level can be set to within a range, such as, for example, between 0V and −5V, or between 0V and +8V, or between 0V and +9V.

Figure 14:
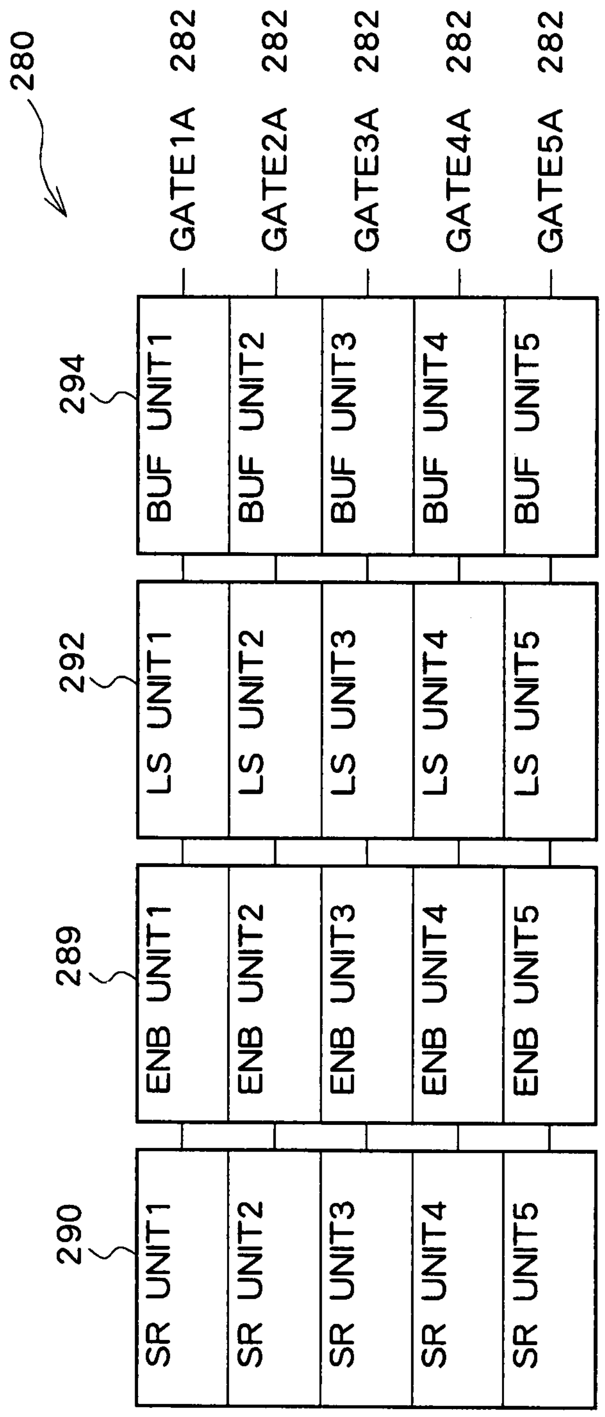
FIG. 14 is a view showing a structure of the scan line drive circuit 1 for each scan line according to the exemplary embodiment illustrated in FIG. 10.

FIG. 14 shows a structure of the scan line drive circuit 1 (280). As shown, in scan line drive circuit 1 (280), for each one first scan line, one shift register circuit unit (SR UNIT) 290, one enable circuit unit (ENB UNIT) 289 controlled by an enable signal, one level shift circuit unit (LS UNIT) 292, and one output driver circuit unit (BUF UNIT) 294 are used.

Figure 15:
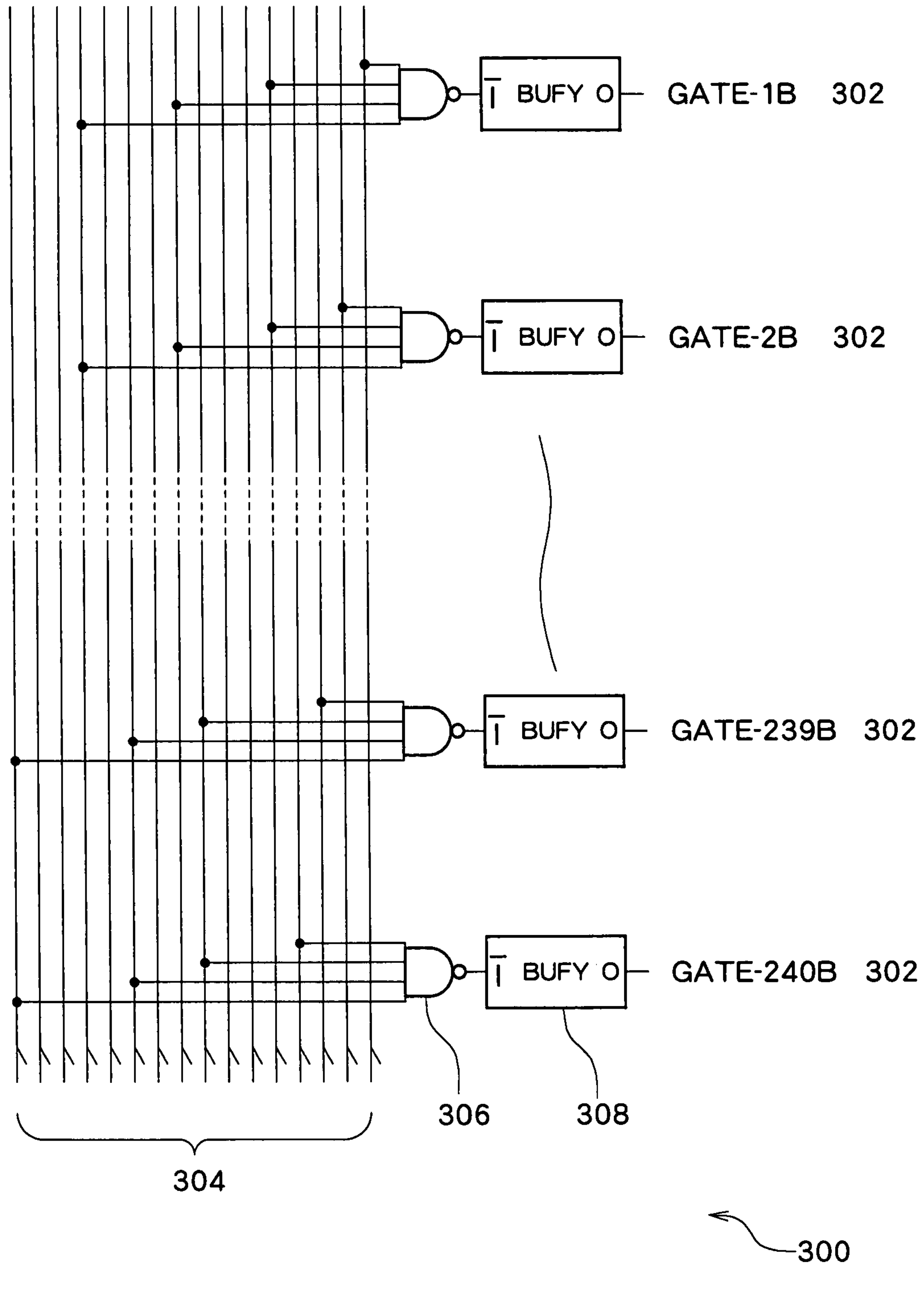
FIG. 15 is a view showing a structure of a scan line drive circuit 2 according to the exemplary embodiment illustrated in FIG. 10.

FIG. 15 shows a structure of the scan line drive circuit 2 (300). The scan line drive circuit 2 (300) is a circuit which generates a signal for selecting each of the second scan lines 302 in accordance with each signal of a plurality of address signal lines 304, and can be formed by a NAND circuit 306 including a plurality of address lines as inputs and a buffer circuit 308. A pre-decoder circuit may be provided before the NAND circuit 306. A circuit having such a structure is referred to as a decoder circuit, which does not require a high operation speed as opposed to the scan line drive circuit 1 (280) which uses a sequential signal and requires a high speed operation. Accordingly, the power consumption of the scan line drive circuit 2 (300) can be reduced compared to that of the scan line drive circuit 1 (280).

The level of a scan line selection signal of the scan line drive circuit 1 (280), i.e. the level of the output driver circuit unit 294, and the level of a scan line selection signal of the scan line drive circuit 2 (300), i.e. the level of the buffer circuit 308, can be made different from each other in accordance with the difference in the operation speeds. For example, as described above, the level of the output driver circuit unit 294 can be set to a range of 0V to +8V and the level of the buffer circuit 308 can be set to a range of 0V to +5V. With this setting, the power consumption of the scan line drive circuit 2 (300) can be further reduced compared to that of the scan line drive circuit 1 (280). Here, it is obvious that the level of the scan line selection signals of the scan line drive circuit 1 (280) and the scan line drive circuit 2 (300) may be identical.

Referring again to FIG. 11, the data line drive circuit 270 is a circuit having a function of inputting an image signal corresponding to each gray level, i.e. a video signal, to the data signal line 272, as described above. Here, a data line drive circuit for use in a general active matrix liquid crystal display apparatus can be used without any changes.

Figure 16:
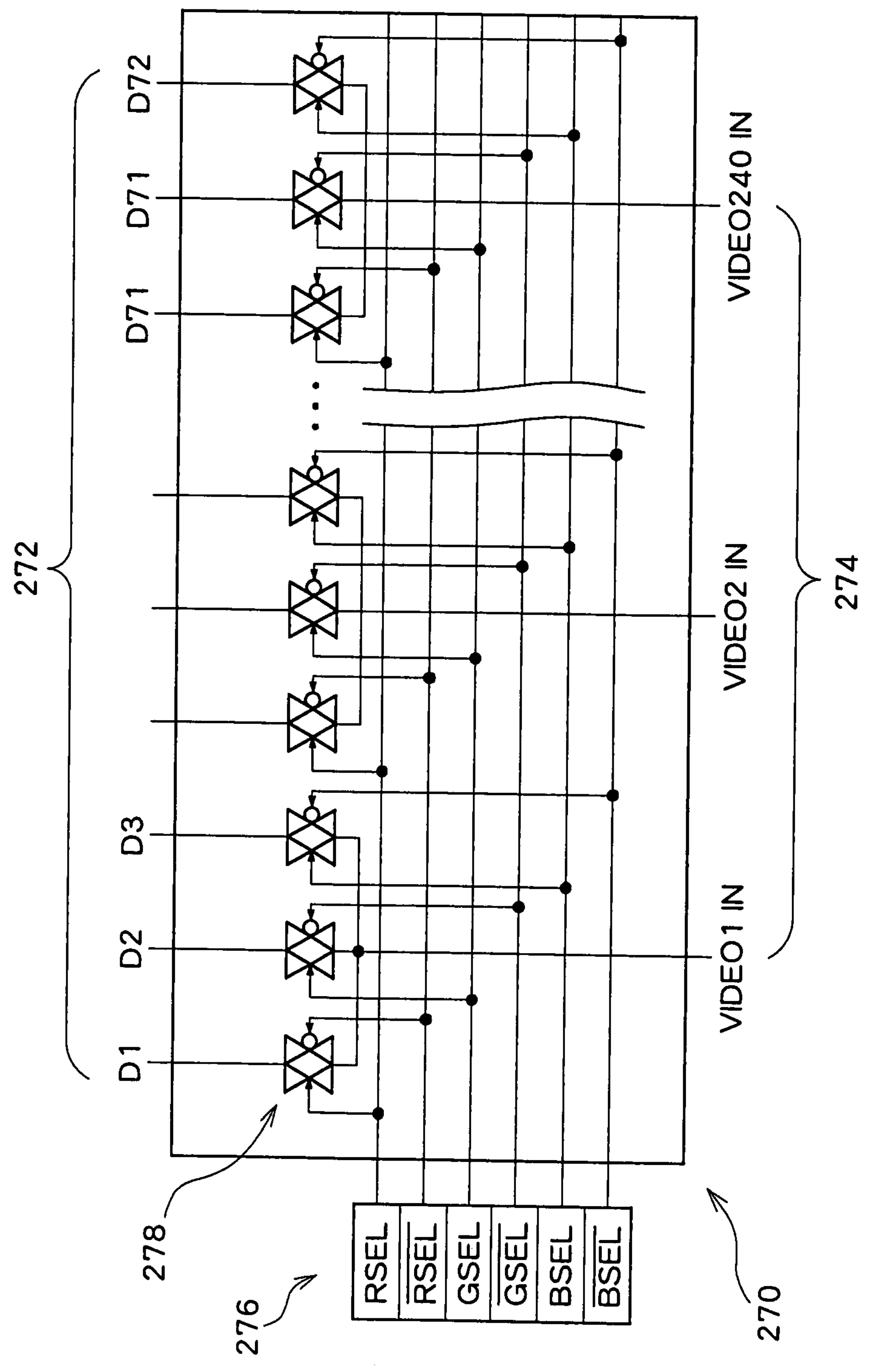
FIG. 16 is a view showing a structure of a data line drive circuit according to the exemplary embodiment illustrated in FIG. 10.

FIG. 16 shows a structure of the data line drive circuit 270. The data line drive circuit 270 is mainly formed of a plurality of demultiplexers 278, to which video signal lines 274 which are externally supplied and select signal lines 276 which are similarly externally supplied are connected. A video signal is divided into three components, which are R, G, and B, by means of a select signal, which are then output to the data signal lines 272 of the respective display pixels which are sub pixels for color display.

The operation of the display apparatus 210 having the above-described structure will be described. The display apparatus 210, during normal operation, performs analog display in full color. At this time, the control IC 232 places the scan line drive circuit 1 (280) in an active state and places the scan line drive circuit 2 (300) in an inactive state. Further, the control IC 232 sets mode switching to the analog display mode, and also sets the mode switching first signal in the MODE (262) at the H level and sets the mode switching second signal in the XMODE (263) at the L level. These signals are then supplied to each display pixel 242. The scan line drive circuit 1 (280) outputs a scan line selection signal such that the first scan line 282 of each display pixel 242 is selected. Consequently, in each display pixel 242, the N channel transistor 244 is turned ON, and also the N channel transistor 248 is turned ON by the mode switching first signal, to thereby actuate the first display circuit for performing analog display. Meanwhile, the N channel transistor 246 on the digital display side is turned OFF, and because the mode switching second signal in XMODE (263) is at the L level, the second display circuit side is completely disconnected from the first display circuit side.

When the display apparatus 210 is in a standby state, the control IC 232 places the scan line drive circuit 2 (300) in an active state and places the scan line drive circuit 1 (280) in an inactive state. Also, the control IC 232 sets mode switching to the digital display mode, and also sets the mode switching first signal in the MODE (262) at the L level and sets the mode switching second signal in the XMODE (263) at the H level. These signals are then supplied to each display pixel 242. The scan line drive circuit 2 (300) outputs a scan line selection signal such that the second scan line 284 of each display pixel 242 is selected. Consequently, in each display pixel 242, the N channel transistor 246 is turned ON and an image signal is held as binary data in the holding circuit 256. Further, the mode switching second signal places the transmission gate 250 in a connected state to thereby actuate the second display circuit for performing digital display. Meanwhile, the N channel transistor 244 on the analog display side is turned OFF, and because the mode switching first signal in MODE (262) is at the L level, the first display circuit side is completely disconnected from the second display circuit side.

As such, both the analog display mode and the digital display mode can be achieved in a single display apparatus 210, and power consumption concerning the standby state can be reduced. Further, because the scan line drive circuit 2

(300), adopting a decoder circuit structure, consumes less electric power than the first scan line drive circuit 1 (280), the power consumption by the whole display apparatus 210 concerning scan line driving can be reduced. In addition, the amplitude of the scan line selection signal can be set to different levels between that for the first scan line 282 and that for the second scan line 284, which results in further decrease in power consumption concerning scan line driving.

Exemplary Embodiment 5

As described above, the scan line drive circuit 2 (300), which is a decoder circuit type, can use a voltage system commonly used in a general logic circuit, whereas in the scan line drive circuit 1 (280) which includes the shift register circuit unit 290, the level shift circuit unit 292, and the output driver circuit unit 294, the voltage system is comparatively complicated. Although the power sources for the scan line drive circuit 1 (280) and the scan line drive circuit 2 (300) may be externally supplied, a power source circuit may be mounted on the lower glass substrate.

Figure 17:
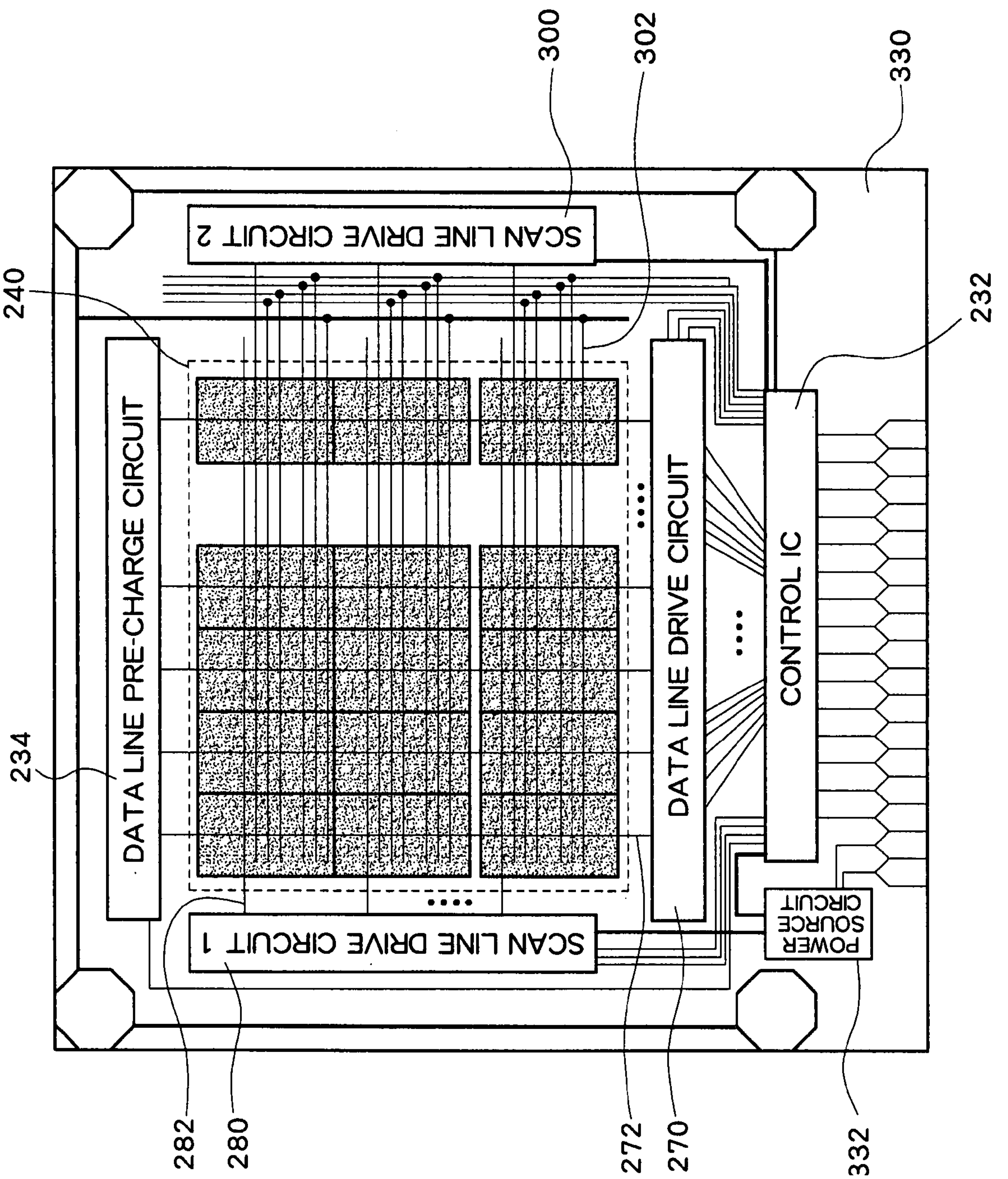
FIG. 17 is a view showing the arrangement on a lower glass substrate according to a still further exemplary embodiment.

FIG. 17 shows an example of a display apparatus having such a structure, in which a power source circuit 332 for the scan line drive circuit 1 (280) is mounted on the lower glass substrate 330. In FIG. 17, the same elements as those in FIG. 11 are designated by the same numerals and will not be described in detail. The power source circuit 332 may be mounted, as an IC chip, on the line pattern on the lower glass substrate 330 by using the COG technology, or alternatively, may be directly formed into the lower glass substrate 330 using poly-silicon transistor forming technology. On the other hand, the power source for the scan line drive circuit 2 (300) can be supplied from the control IC 32.

Exemplary Embodiment 6

Figure 18:
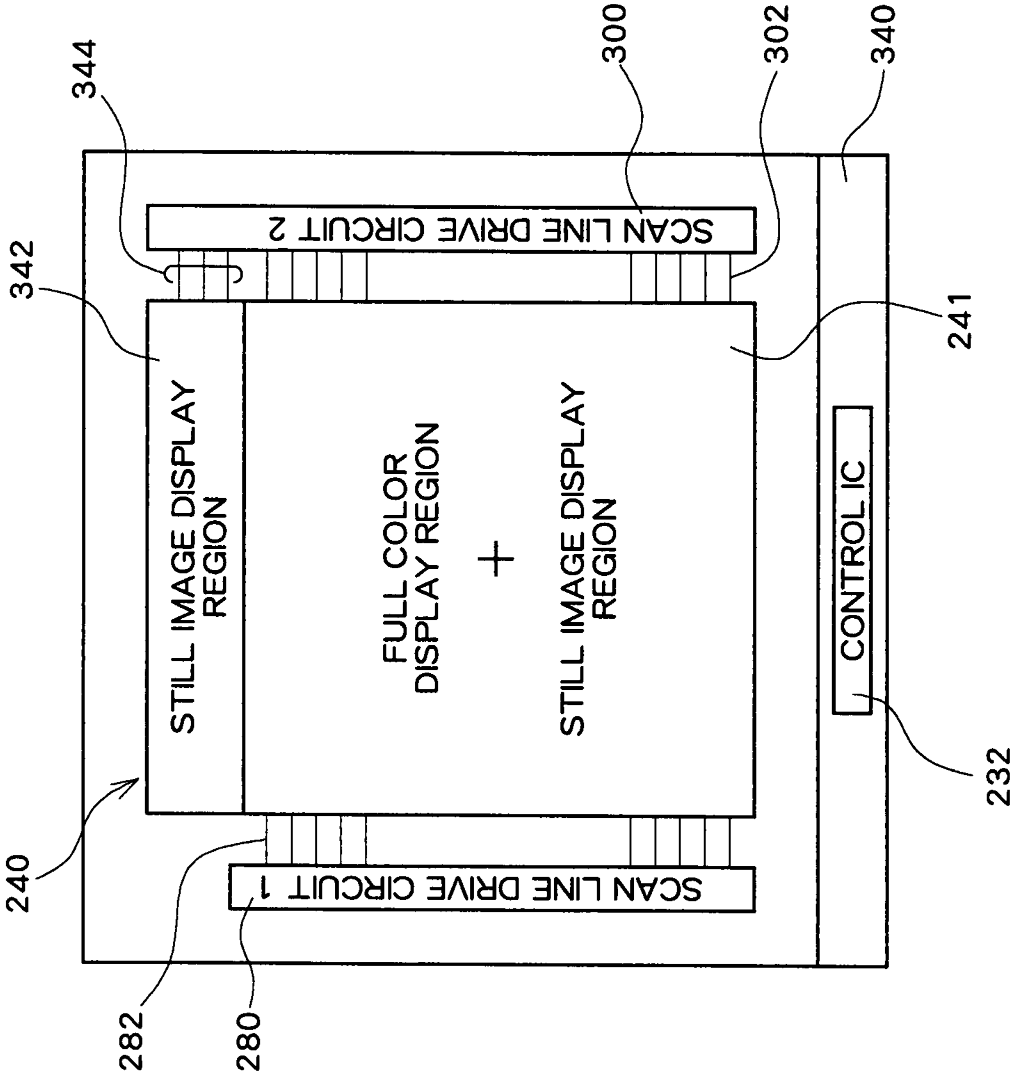
FIG. 18 is a view for explaining segments of a display region according to the exemplary embodiment illustrated in FIG. 17.
Figure 19:
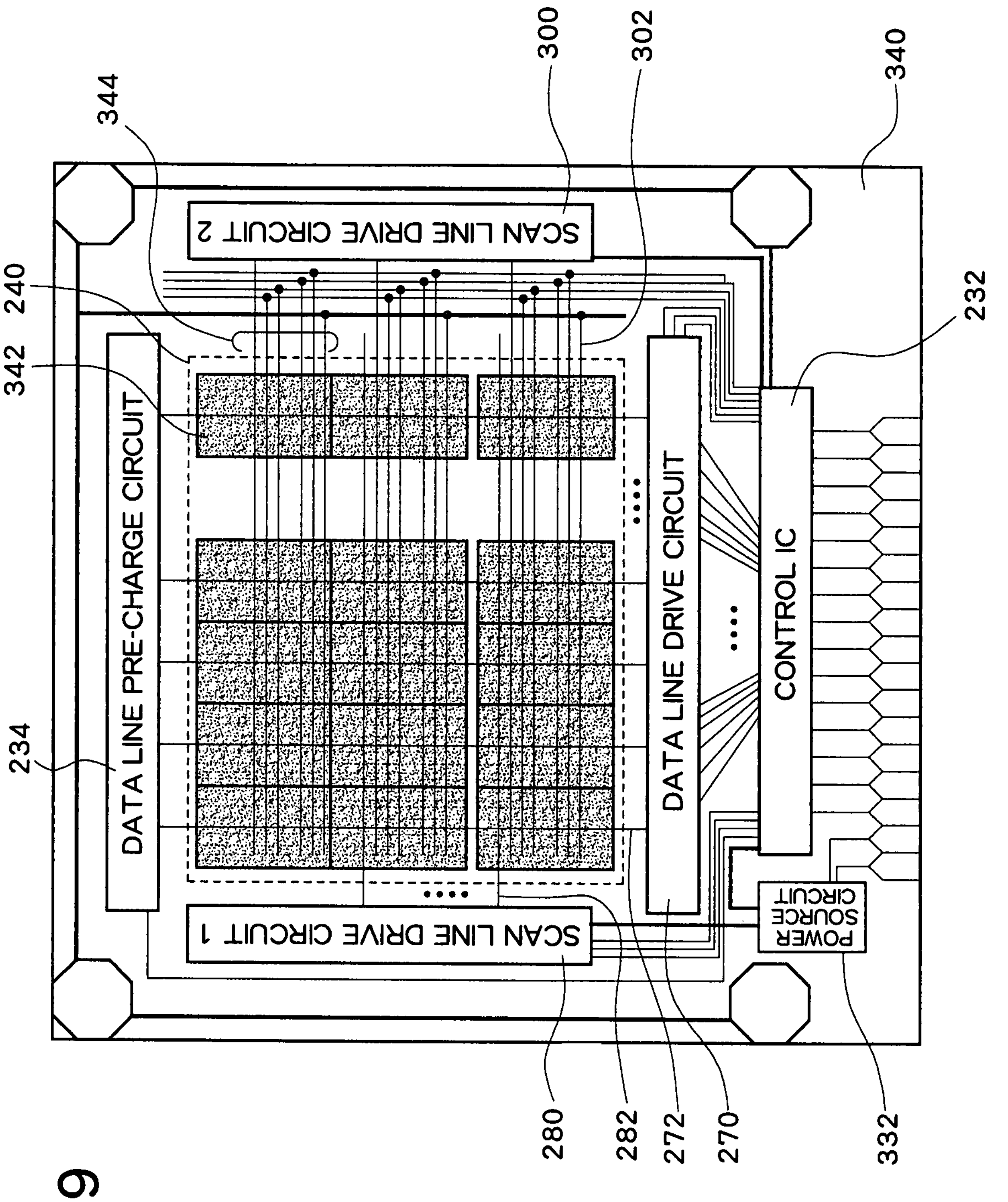
FIG. 19 is a view showing the lines on the lower glass substrate in the example shown in FIG. 18.

While in the above examples, a pair of the first scan line and the second scan line is disposed for each display pixel, the first scan line and the second scan line may not be provided in pairs in some display pixels. FIGS. 18 and 19 show a structure of a lower glass substrate 340 in which only the second scan lines are disposed in some display pixels. On the other hand, it is also possible to dispose only the first scan lines in some display pixels. In the following description, elements in FIGS. 18 and 19 which are similar to those in FIGS. 11 and 17 are designated by the same numerals and will not be described in detail.

As shown in FIG. 18, in the lower glass substrate 340, the display region 240 is divided into two portions, in one of which a pair of the first scan line 282 and the second scan line 302 is provided in each display pixel and in the other of which only the second scan line is disposed in each display pixel. With this structure, the former portion can be designated as a region (full color display region+still image display region) 241 as described with reference to FIG. 11 and the following figures, and the latter portion can be designated as a still image display region 342 in which only the still image can be displayed. These regions may be fixed regions.

FIG. 19, similar to FIGS. 11 and 17, shows how lines of each element are arranged on the lower glass substrate 340 in the case of the structure shown in FIG. 18. As shown in FIG. 19, in the still image display region 342 which is a portion of the display region 240, a scan line selection signal is supplied only by the second scan line 344 from the scan line drive circuit 2 (300).

What is claimed is:

1. A display apparatus, comprising:

a plurality of first scan lines for analog display, which are arranged along a first direction on a substrate;

a plurality of second scan lines for digital display, which are arranged along the first direction on the substrate, wherein the plurality of first scan lines are different scan lines than the plurality of second scan lines;

a plurality of data signal lines which are arranged in a second direction intersecting the first direction;

a plurality of display pixels which are selected by a predetermined scan line selection signal concerning the plurality of first scan lines and the plurality of second scan lines and to which an image signal from the data signal lines is supplied, the plurality of display pixels being arranged in a matrix on the substrate and including display pixels which are each provided with a first scan line of the plurality of first scan lines connected to a first switch circuit and a second scan line of the plurality of second scan lines connected to a second switch circuit;

a first display circuit for the analog display, which is connected to one of the plurality of first scan lines via one of the first switch circuits which operates by means of a first scan line selection signal which is supplied from the one of the plurality of first scan lines, and which is disposed in a display pixel, the first display circuit sequentially supplying the image signal which is sequentially input to a pixel electrode of the display pixel, a second display circuit for the digital display, which is connected to one of the plurality of second scan lines via one of the second switch circuits which operates by means of a second scan line selection signal which is supplied from the one of the plurality of second scan lines, and which is disposed in the display pixel, the second display circuit including a holding circuit which holds the image signal and supplying a voltage in accordance with the signal held by the holding circuit to the pixel electrode;

a mode switching circuit for performing mode switching between an analog display mode in which the first display circuit operates and a digital display mode in which the second display circuit operates, in accordance with a mode switching signal; and a plurality of mode signal lines which are arranged along the first direction on the substrate and provided to the plurality of display pixels, wherein the plurality of mode signal lines transmit mode switching signals for switching between using the plurality of first scan lines for the analog display mode and using the plurality of second scan lines for the digital display mode, in accordance with the mode switching signal, wherein the mode switching signal is composed of a mode switching first signal and a mode switching second signal having different signal amplitudes and different polarities, the mode switching first signal is supplied to a first mode signal line of the plurality of mode signal lines, the mode switching second signal is supplied to a second mode signal line of the plurality of mode signal lines that is different from the first mode signal line, the mode switching circuit activates the first display circuit under the condition that the mode switching first signal is turned ON and activates the second display circuit under the condition that the mode switching second signal is turned ON, and the mode switching circuit includes:

a third switch circuit which is provided between the first switch circuit and the pixel electrode and operates in accordance with the mode switching first signal; and a fourth switch circuit which is provided between the holding circuit and the pixel electrode and operates in accordance with the mode switching second signal, the fourth switch circuit supplying a signal to the pixel electrode having an identical phase or a reversed phase with respect to an opposing electrode signal applied to an opposing electrode which is opposed to the pixel electrode.

2. The display apparatus according to claim 1, comprising:

a first scan line drive circuit which outputs the first scan line selection signal concerning the first scan line; and a second scan line drive circuit which outputs the second scan line selection signal concerning the second scan line, wherein the first scan line drive circuit and the second scan line drive circuit share a shift register circuit unit which outputs a sequential designation pulse for sequentially designating the display pixel in units of scan lines, and a distribution circuit unit provided after the shift register circuit unit which is shared distributes the sequential designation pulse to the first scan line or the second scan line.

3. The display apparatus according to claim 2, comprising:

a first output circuit and a second output circuit connected to each other in parallel for each output of the shift register circuit unit, a plurality of first output circuits being provided corresponding to the plurality of first scan lines, respectively, and a plurality of second output circuits being provided corresponding to the plurality of second scan lines, respectively, wherein the distribution circuit unit distributes an output of the first output circuit or an output of the second output circuit to the first scan line or the second scan line, by using a distribution signal.

4. The display apparatus according to claim 3, wherein the distribution circuit unit is formed of a NOR circuit or a transmission gate.

5. The display apparatus according to claim 2, wherein the mode switching signal is used as the distribution signal.

6. The display apparatus according to claim 1, wherein the first scan line selection signal of the first scan line and the second scan line selection signal of the second scan line have different signal amplitudes.

7. The display apparatus according to claim 1, comprising:

a first scan line drive circuit which outputs the first scan line selection signal concerning the first scan line, the first scan line drive circuit including a shift register circuit unit which outputs a sequential designation pulse for sequentially designating each of the first scan lines which is desired; and a second scan line drive circuit which outputs the second scan line selection signal concerning the second scan line, the second scan line drive circuit including a decoder circuit unit for obtaining access to each of the second scan lines which is desired.

8. The display apparatus according to claim 7, wherein the first scan line selection signal of the first scan line and the second scan line selection signal of the second scan line have different signal amplitudes.

9. The display apparatus according to claim 8, comprising:

a power source circuit unit which is formed on the substrate for generating power to be supplied to the first scan line drive circuit; and a control circuit unit which is formed on the substrate for controlling each element on the substrate, the control circuit unit supplying power to the second scan line drive circuit.

10. The display apparatus according to claim 7, wherein a display region exclusively used for the digital display in which a plurality of pixels to be driven only by the second scan line drive circuit are arranged is provided on the substrate.

11. The display apparatus according to claim 10, wherein when digital display is performed in the display region exclusively used for digital display, display is not performed in other display regions.

12. A display apparatus, comprising:

a plurality of first scan lines which are arranged in a first direction on a substrate;

a plurality of second scan lines which are arranged in the first direction on the substrate, wherein the plurality of first scan lines are different scan lines than the plurality of second scan lines;

a plurality of data signal lines which are arranged in a second direction intersecting the first direction;

display pixels which are selected by a predetermined scan line selection signal concerning the plurality of first scan lines and the plurality of second scan lines and to which an image signal from the data signal lines is supplied, each of the display pixels being arranged in a matrix on the substrate and provided with a first scan line of the plurality of first scan lines connected to a first switch circuit and a second scan line of the plurality of second scan lines connected to a second switch circuit;

a first scan line drive circuit which outputs a scan line selection signal concerning the plurality of first scan lines, the first scan line drive circuit including a shift register circuit unit which outputs a sequential designation pulse for sequentially designating each of the plurality of first scan lines;

a second scan line drive circuit which outputs a scan line selection signal concerning the plurality of second scan lines, the second scan line drive circuit including a decoder circuit unit for obtaining access to a desired scan line of the plurality of second scan lines;

a plurality of mode signal lines which are arranged on the first direction on the substrate and provided to the display pixels, wherein the plurality of mode signal lines transmit mode switching signals for switching between using the plurality of first scan lines and using the plurality of second scan lines, in accordance with the mode switching signal;

a first display circuit for analog display, which is connected to one of the plurality of first scan lines via a first switch circuit which operates by means of a first scan line selection signal which is supplied from the one of the plurality of first scan lines, and which is disposed in a display pixel, the first display circuit sequentially supplying the image signal which is sequentially input to a pixel electrode of the display pixel;

a second display circuit for digital display, which is connected to one of the plurality of second scan lines via a second switch circuit which operates by means of a second scan line selection signal which is supplied from the one of the plurality of second scan lines, and which is disposed in the display pixel, the second display circuit including a holding circuit which holds the image signal and supplying a voltage in accordance with the signal held by the holding circuit to the pixel electrode; and a mode switching circuit for performing mode switching between an analog display mode in which the first display circuit operates and a digital display mode in which the second display circuit operates, in accordance with a switching signal, wherein the mode switching signal is composed of a mode switching first signal and a mode switching second signal having different signal amplitudes and different polarities, the mode switching first signal is supplied to a first mode signal line of the plurality of mode signal lines, the mode switching second signal is supplied to a second mode signal line of the plurality of mode signal lines that is different from the first mode signal line, the mode switching circuit activates the first display circuit under the condition that the mode switching first signal is turned ON and activates the second display circuit under the condition that the mode switching second signal is turned ON, and the mode switching circuit includes:

a third switch circuit which is provided between the first switch circuit and the pixel electrode and operates in accordance with the mode switching first signal; and a fourth switch circuit which is provided between the holding circuit and the pixel electrode and operates in accordance with the mode switching second signal, the fourth switch circuit supplying to the pixel electrode a signal having an identical phase or a reversed phase with respect to an opposing electrode signal applied to an opposing electrode which is opposed to the pixel electrode.

13. A display apparatus, comprising:

a plurality of first scan lines for analog display, which are arranged along a first direction on a substrate;

a plurality of second scan lines for digital display, which are arranged along the first direction on the substrate, wherein the plurality of first scan lines are different scan lines than the plurality of second scan lines;

a plurality of data signal lines which are arranged in a second direction intersecting the first direction;

a plurality of display pixels which are selected by a predetermined scan line selection signal concerning the plurality of first scan lines and the plurality of second scan lines and to which an image signal from the data signal lines is supplied, the plurality of display pixels being arranged in a matrix on the substrate and including a display pixel which is connected to a first scan line of the plurality of first scan lines and a second scan line of the plurality of second scan lines, wherein the first scan line is a different scan line than the second scan line;

a first display circuit for the analog display, which is connected to one of the plurality of first scan lines via a first switch circuit which operates by means of a first scan line selection signal which is supplied from the one of the plurality of first scan lines, and which is disposed in a display pixel, the first display circuit sequentially supplying the image signal which is sequentially input to a pixel electrode of the display pixel;

a second display circuit for the digital display, which is connected to one of the plurality of second scan lines via a second switch circuit which operates by means of a second scan line selection signal which is supplied from the one of the plurality of second scan lines, and which is disposed in the display pixel, the second display circuit including a holding circuit which holds the image signal and supplying a voltage in accordance with the signal held by the holding circuit to the pixel electrode;

a mode switching circuit for performing mode switching between an analog display mode in which the first display circuit operates and a digital display mode in which the second display circuit operates, in accordance with a mode switching signal; and a plurality of mode signal lines which are arranged along the first direction on the substrate and provided to the plurality of display pixels, wherein the plurality of mode signal lines transmit mode switching signals for switching between using the plurality of first scan lines for the analog display mode and using the plurality of second scan lines for the digital display mode, in accordance with the mode switching signal, wherein the mode switching signal is composed of a mode switching first signal and a mode switching second signal having different signal amplitudes and different polarities, the mode switching first signal is supplied to a first mode signal line of the plurality of mode signal lines, the mode switching second signal is supplied to a second mode signal line of the plurality of mode signal lines that is different from the first mode signal line, the mode switching circuit activates the first display circuit under the condition that the mode switching first signal is turned ON and activates the second display circuit under the condition that the mode switching second signal is turned ON, and the mode switching circuit includes:

a third switch circuit which is provided between the first switch circuit and the pixel electrode and operates in accordance with the mode switching first signal; and a fourth switch circuit which is provided between the holding circuit and the pixel electrode and operates in accordance with the mode switching second signal, the fourth switch circuit supplying to the pixel electrode a signal having an identical phase or a reversed phase with respect to an opposing electrode signal applied to an opposing electrode which is opposed to the pixel electrode.

* * * * *